(12) United States Patent
Hill

(10) Patent No.: US 7,009,712 B2
(45) Date of Patent: Mar. 7, 2006

(54) LEAKY GUIDED WAVE MODES USED IN INTERFEROMETRIC CONFOCAL MICROSCOPY TO MEASURE PROPERTIES OF TRENCHES

(75) Inventor: Henry Allen Hill, Tucson, AZ (US)

(73) Assignee: Zetetic Institute, Tuscon, AZ (US)

( * ) Notice: Subject to any disclaimer, the term of this patent is extended or adjusted under 35 U.S.C. 154(b) by 130 days.

(21) Appl. No.: 10/765,254

(22) Filed: Jan. 27, 2004

(65) Prior Publication Data

US 2005/0128487 A1    Jun. 16, 2005

Related U.S. Application Data

(60) Provisional application No. 60/442,858, filed on Jan. 27, 2003, provisional application No. 60/442,892, filed on Jan. 28, 2003, provisional application No. 60/443,980, filed on Jan. 31, 2003.

(51) Int. Cl.
*G01B 9/02* (2006.01)

(52) U.S. Cl. ............................. 356/496; 356/521

(58) Field of Classification Search .............. 356/73.1, 356/450, 505, 251, 496, 485, 492
See application file for complete search history.

(56) References Cited

U.S. PATENT DOCUMENTS

| | | | |
|---|---|---|---|
| 3,628,027 A | 12/1971 | Brauss | |
| 3,748,015 A | 7/1973 | Offner | |
| 4,011,011 A | 3/1977 | Hemstreet et al. | |
| 4,226,501 A | 10/1980 | Shafer | |
| 4,272,684 A | 6/1981 | Seachman | |
| 4,408,884 A * | 10/1983 | Kleinknecht et al. | ....... 356/496 |
| 4,685,803 A | 8/1987 | Sommargren | |
| 4,733,967 A | 3/1988 | Sommargren | |
| 5,220,403 A | 6/1993 | Batchelder | |
| 5,241,423 A | 8/1993 | Chiu et al. | |
| 5,327,223 A | 7/1994 | Korth | |
| 5,384,639 A * | 1/1995 | Wickramasinghe | ......... 356/496 |
| 5,392,118 A * | 2/1995 | Wickramasinghe | ......... 356/496 |
| 5,633,972 A | 11/1995 | Walt | |
| 5,485,317 A | 1/1996 | Perissinotto | |
| 5,602,643 A | 2/1996 | Barrett | |
| 5,894,195 A | 5/1996 | McDermott | |
| 5,915,048 A | 6/1996 | Hill et al. | |
| 5,760,901 A | 1/1997 | Hill | |
| 5,614,763 A | 3/1997 | Womack | |

(Continued)

OTHER PUBLICATIONS

U.S. Appl. No. 09/852,369, filed Jan. 3, 2002, Hill.

(Continued)

*Primary Examiner*—Gregory J. Toatley, Jr.
*Assistant Examiner*—Patrick Connolly
(74) *Attorney, Agent, or Firm*—Wilmer Cutler Pickering Hale and Dorr LLP

(57) ABSTRACT

A method of using an interferometric confocal microscope to measure features of a trench or via in a substrate, wherein the interferometric confocal microscope produces a measurement beam, the method involving: focusing the measurement beam at a selected location at or near the bottom of the trench or via to excite one or more guided-wave modes within the trench or via; measuring properties of a return measurement beam that is produced when the measurement beam is focused at the selected location, wherein the return measurement beam includes a component corresponding to a radiated field from the one or more guided-wave modes that are excited within the trench; and determining the features of the trench or via from the measured properties of the return measurement beam.

16 Claims, 5 Drawing Sheets

U.S. PATENT DOCUMENTS

| | | | |
|---|---|---|---|
| 5,659,420 A | 8/1997 | Wakai | |
| 5,699,201 A | 12/1997 | Lee | |
| 5,757,493 A | 5/1998 | Vankerkhove | |
| 6,091,496 A | 6/1998 | Hill | |
| 5,828,455 A | 10/1998 | Smith | |
| 6,330,065 B1 | 3/1999 | Hill | |
| 6,011,654 A | 1/2000 | Schweizer et al. | |
| 6,480,285 B1 | 3/2000 | Hill | |
| 6,052,231 A | 4/2000 | Rosenbluth | |
| 6,445,453 B1 | 8/2000 | Hill | |
| 6,606,159 B1 | 8/2000 | Hill | |
| 6,124,931 A | 9/2000 | Hill | |
| 6,552,805 B1 | 7/2001 | Hill | |
| 6,667,809 B1 | 7/2001 | Hill | |
| 6,775,009 B1 | 7/2001 | Hill | |
| 6,271,923 B1 | 8/2001 | Hill | |
| 6,552,852 B1 | 12/2001 | Hill | |
| 6,714,349 B1 | 3/2002 | Nam | |
| 6,447,122 B1 | 9/2002 | Kobayashi et al. | |
| 6,486,965 B1 * | 11/2002 | Kim | 356/626 |
| 6,753,968 B1 | 1/2003 | Hill | |
| 6,597,721 B1 | 7/2003 | Hutchinson et al. | |
| 6,717,736 B1 | 7/2003 | Hill | |
| 6,707,561 B1 * | 3/2004 | Budach et al. | 356/521 |
| 6,771,376 B1 * | 8/2004 | Budach et al. | 356/521 |
| 6,847,452 B1 | 1/2005 | Hill | |
| 6,867,869 B1 * | 3/2005 | Budach et al. | 356/521 |
| 6,870,630 B1 * | 3/2005 | Budach et al. | 356/521 |
| 6,878,301 B1 * | 4/2005 | Mundt | 356/496 |
| 2002/0074493 A1 | 7/2001 | Hill | |
| 2002/0131179 A1 | 9/2002 | Hill | |
| 2003/0174992 A1 | 9/2003 | Levene | |
| 2004/0201852 A1 | 2/2004 | Hill | |
| 2004/0201853 A1 | 2/2004 | Hill | |
| 2004/0201854 A1 | 2/2004 | Hill | |
| 2004/0246486 A1 | 9/2004 | Hill | |
| 2004/0201855 A1 | 10/2004 | Hill | |
| 2004/0202426 A1 | 10/2004 | Hill | |
| 2004/0227950 A1 | 11/2004 | Hill | |
| 2004/0227951 A1 | 11/2004 | Hill | |
| 2004/0228008 A1 | 11/2004 | Hill | |
| 2004/0257577 A1 | 12/2004 | Hill | |
| 2005/0036149 A1 | 2/2005 | Hill | |

OTHER PUBLICATIONS

U.S. Appl. No. 09/917,402, filed Jul. 27, 2001, Hill.
U.S. Appl. No. 10/765,254, filed Jan. 27, 2004, Hill.
U.S. Appl. No. 10/765,368, filed Jan. 27, 2004, Hill.
U.S. Appl. No. 10/886,157, filed Jul. 7, 2004, Hill.
U.S. Appl. No. 60/442,858, filed Jul. 27, 2002, Hill.
U.S. Appl. No. 60/442,982, filed Jan. 29, 2003, Hill.
U.S. Appl. No. 60/443,980, filed Jan. 31, 2003, Hill.
U.S. Appl. No. 60/444,707, filed Jan. 4, 2003, Hill.
U.S. Appl. No. 60/445,739, filed Feb. 7, 2003, Hill.
U.S. Appl. No. 60/447,254, filed Feb. 13, 2003, Hill.
U.S. Appl. No. 60/448,250, filed Jan. 19, 2003, Hill.
U.S. Appl. No. 60/448,360, filed Feb. 19, 2003, Hill.
U.S. Appl. No. 60/459,425, filed Apr. 11, 2003, Hill.
U.S. Appl. No. 60/459,493, filed Apr. 1, 2003, Hill.
U.S. Appl. No. 60/460,129, filed Apr. 3, 2003, Hill.
U.S. Appl. No. 60/485,255, filed Jul. 7, 2003, Hill.
U.S. Appl. No. 60/485,507, filed Jul. 7, 2003, Hill.
U.S. Appl. No. 60/501,666, filed Sep. 10, 2003, Hill.
U.S. Appl. No. 60/506,715, filed Sep. 26, 2003, Hill.

* cited by examiner

LEAKY GUIDED WAVE MODES USED IN INTERFEROMETRIC CONFOCAL MICROSCOPY TO MEASURE PROPERTIES OF TRENCHES

This application claims the benefit of U.S. Provisional Application No. 60/443,980, filed Jan. 31, 2003 (ZI-46); U.S. Provisional Application No. 60/442,858, filed Jan. 27, 2003 (ZI-47); and U.S. Provisional Application No. 60/442,892, filed Jan. 28, 2003 (ZI-45).

BACKGROUND OF THE INVENTION

Confocal and interferometric confocal microscopy has been used to measure lateral spatial properties of trenches and trench arrays (see S. S. C. Chim and G. S. Kino, "Optical pattern recognition measurements of trench arrays with submicrometer dimensions," *Applied Optics* 33, pp 678–685, 1994). However, confocal and interferometric confocal microscopy has not thus far been used to obtain information about the depth and widths of trenches.

SUMMARY OF THE INVENTION

The techniques described herein provide a way to use interferometric confocal microscopy to obtain information about the depth and width of trenches. The techniques involve exciting leaky guided-wave modes of a trench that may be symmetric or antisymmetric in a directions parallel or orthogonal to the walls of the trench by either a symmetric or an antisymmetric near-field beam in directions parallel to or orthogonal to the walls of the trench or by either a symmetric or an antisymmetric far-field optical beam in directions parallel to or orthogonal to the walls of the trench and focused to a spot that forms a corresponding symmetric or an antisymmetric image. The properties of the fields radiated by the excited leaky guided-wave modes are then measured to obtain information about the depth and width of the trench and/or the detection of included defects. Properties of the fields radiated by the excited guided-wave modes are measured using an interferometric confocal microscope. For measurement of properties of excited antisymmetric guided-wave modes, the interferometric confocal microscope may compensate for the effects of the antisymmetric properties of the excited guided-wave modes on the radiated fields to eliminate/reduce effects of background beams. The beams generated by fields radiated by the excited guided-wave modes exhibit properties different from background beams and these differences are used to compensate for and/or also eliminate/reduce effects of the background beams.

The boundaries of the trench may comprise for example dielectric, semiconductor, and conducting materials. The trench may also be filled with a transparent medium.

Images formed of return measurement beams comprising fields radiated by the excited guided-wave modes exhibit astigmatism that can be compensated in the imaging system of the interferometric confocal microscope. The compensation of the astigmatism increases signal-to-noise ratios of measured conjugated quadratures of the fields of the corresponding return measurement beams. The compensation of the astigmatism further leads to increases in throughput.

In general, in one aspect, the invention features a method of using an interferometric confocal microscope to measure features of a trench or via in a substrate, wherein the interferometric confocal microscope produces a measurement beam. The method involves: focusing the measurement beam at a selected location at or near the bottom of the trench or via to excite one or more guided-wave modes within the trench or via; measuring properties of a return measurement beam that is produced when the measurement beam is focused at the selected location, wherein the return measurement beam includes a component corresponding to a radiated field from the one or more guided-wave modes that are excited within the trench; and determining the features of the trench or via from the measured properties of the return measurement beam.

Other embodiments include one or more of the following features. The method also includes scanning the measurement beam in a direction that is substantially normal to the substrate to locate the bottom of the trench or via. The step of determining features involves determining a depth of the trench or via. The one or more guided-wave modes that are excited are leaky guided-wave modes. The method also includes either generating a measurement beam that is asymmetric or generating a measurement beam that is asymmetric. The measuring of the properties of the return measurement beam involves measuring conjugated quadratures of fields of the return measurement beam. The step of measuring the properties of the return measurement beam involves using a bi-homodyne detection technique or a quad-homodyne detection technique. The interferometric confocal microscope is a far-field interferometric confocal microscope and the measurement beam is a far-field measurement beam. Or alternatively, the interferometric confocal microscope is a near-field interferometric confocal microscope and the measurement beam is a near-field measurement beam.

The method also includes focusing the measurement beam at a selected distance above the surface of the substrate and over the trench or via; and measuring properties of a return measurement beam that is produced when the measurement beam is focused at the selected distance above the surface of the substrate and over the trench or via. In this case, the step of determining the features of the trench or via involves combining measurements of properties of the first-mentioned return measurement beam and measurements of properties of the second-mentioned return measurement beam. In this case, the selected location is a distance Z1 below the top surface of the substrate, and the selected distance is a distance Z2 above the surface of the substrate, and wherein Z1 equals Z2. The measuring of properties of the field of a return measurement beam that is produced when the measurement beam is focused at the selected distance above the surface of the substrate and over the trench or via involves measuring conjugated quadratures of fields of that return measurement beam. The step of determining the features of the trench or via involves combining the measurements of conjugated quadratures of fields of the return measurement beam that is produced when the measurement beam is focused at the selected location and measurements of conjugated quadratures of fields of the return measurement beam that is produced when the measurement beam is focused at the selected distance above the surface of the substrate and over the trench or via In other embodiments, the method further involves performing the steps of focusing and measuring at a plurality of locations along the bottom of the trench to detect a defect within the trench.

An advantage of at least some embodiments of the present invention is that the depth of high aspect ratio trenches can be measured by a non-contact method.

Another advantage of at least some embodiments of the present invention is that the properties of a trench may be measured by an interferometric far-field confocal microscopy system with a lateral resolution down to approximately 100 nm and with a depth resolution down to approximately 200 nm.

Another advantage of at least some embodiments of the present invention is that the properties of a trench may be measured by an interferometric far-field confocal microscopy system with a subwavelength lateral resolution and with a depth resolution down to approximately a VUV wavelength.

Another advantage of at least some embodiments of the present invention is that the leaky guided-wave modes of a high aspect ratio trench are used to measure properties of the trench.

Another advantage of at least some embodiments of the present invention is that antisymmetric leaky guided-wave modes of a high aspect ratio trench are used to measure properties of the trench.

Another advantage of at least some embodiments of the present invention is that effects of certain background signals are eliminated interferometrically.

Another advantage of at least some embodiments of the present invention is that effects of certain other background signals are compensated.

Another advantage of at least some embodiments of the present invention is that astigmatism of images of a trench using fields radiated by excited leaky guided-wave modes of the trench can be compensated by astigmatism of an interferometric confocal microscopy system.

Another advantage of at least some embodiments of the present invention is that the medium defining the boundaries of a trench being probed may comprise conductors, semiconductors, and dielectrics.

Another advantage of at least some embodiments of the present invention is that joint conjugated quadratures of fields of a return measurement beam generate by fields radiated by excited guided-wave modes of a trench may be determined using bi- and quad-homodyne detection methods and multi-pixel detectors.

The details of one or more embodiments of the invention are set forth in the accompanying drawings and the description below. Other features, objects, and advantages of the invention will be apparent from the description and drawings, and from the claims.

DETAILED DESCRIPTION

As will be described in greater detail below, leaky guided-wave modes that have either antisymmetrical or symmetrical spatial properties are excited in trenches by either far-field or near-field beams and are used in interferometric confocal microscopy to probe properties of the trenches located for example on a wafer. The properties of trenches comprise a depth and a critical dimension of a trench and defects located within the trench. Effects of certain background signals are eliminated interferometrically and certain other background signals are compensated in determination of conjugated quadratures of radiated fields generated by the excited leaky guided-wave modes. Images formed of return measurement beams comprising the radiated fields generated by the excited guided-wave modes exhibit astigmatism that is beneficially used in interferometric far-field and near-field confocal imaging systems and that can be compensated in interferometric far-field confocal imaging system. The beneficial use and/or compensation of the astigmatism increases signal-to-noise ratios of measured conjugated quadratures of fields of the corresponding return measurement beams. The beneficial use and/or compensation of the astigmatism further leads to increases in throughput. The excitation of leaky guided wave modes in vias may also be used to determine properties of the vias.

Figure 1A:
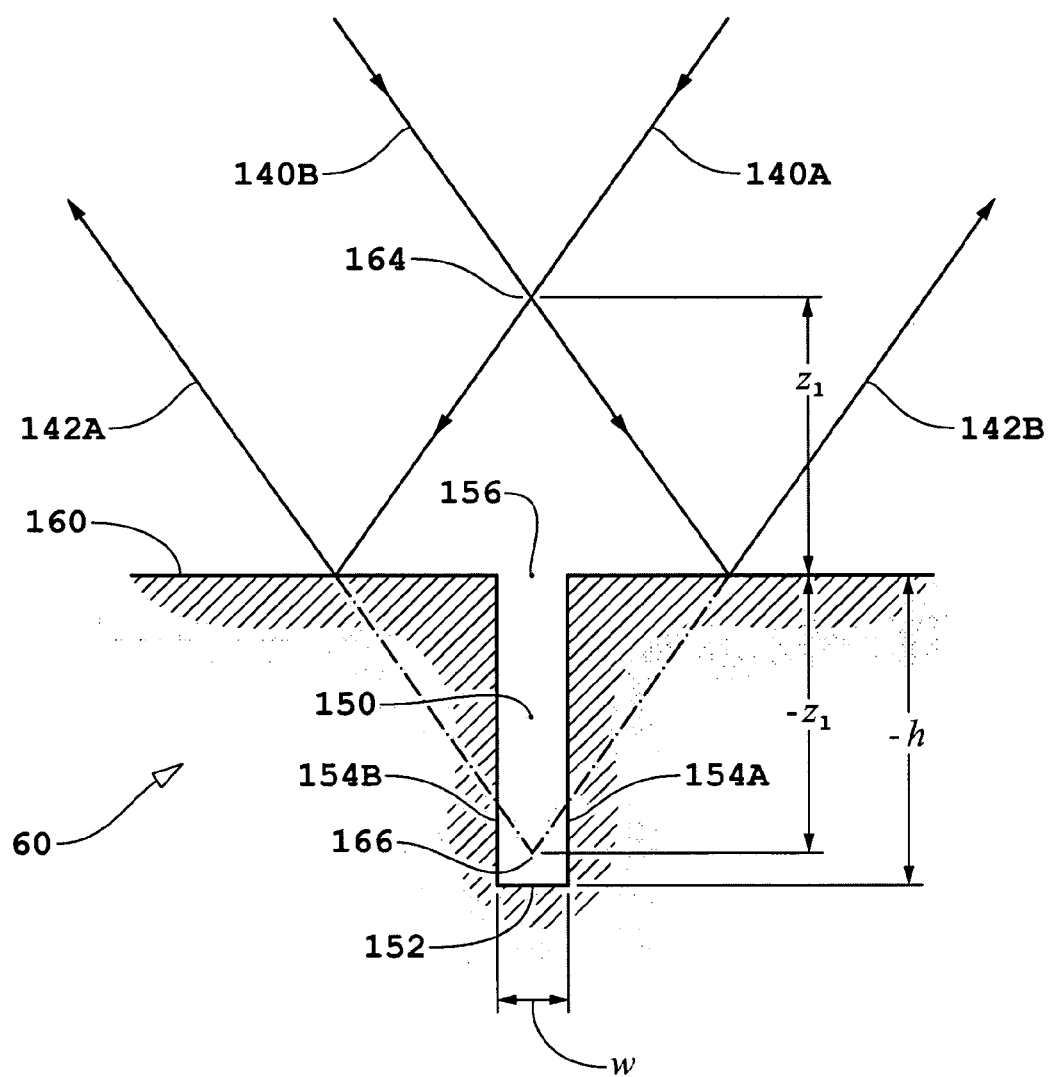
FIGS. 1a–1c are diagrammatic representations of trenches and paths of optical beams.
Figure 1B:
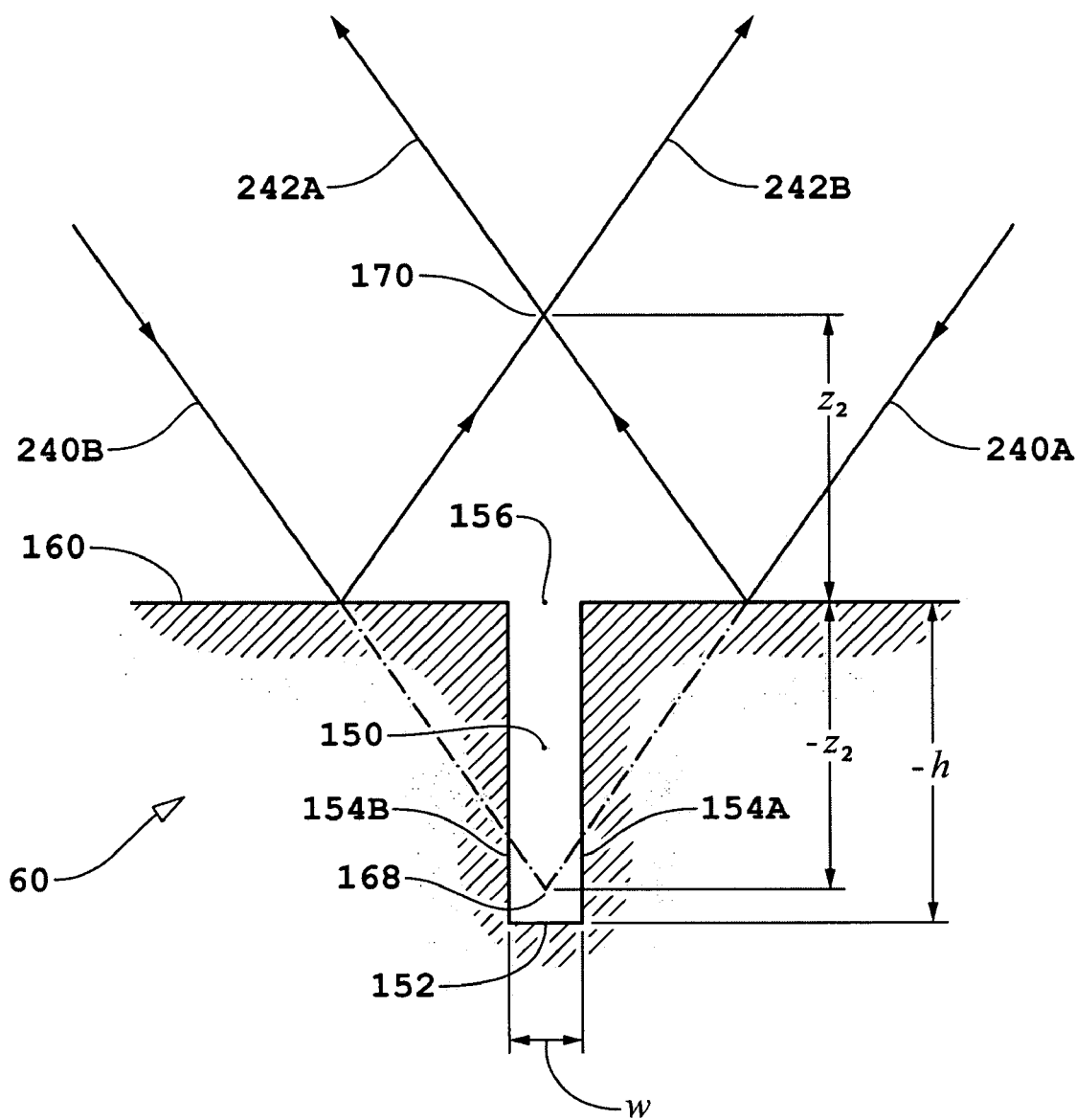

A beam of an array of measurement beams that is focused to a spot below, at, or above a plane surface of a substrate will, in general, generate a return measurement beam comprising a single component. When there is a trench in the substrate that crosses a defocused or focused spot of the beam formed at the surface of the substrate, the return measurement beam subsequently generated will comprise three components. Referring to FIGS. 1a and 1b, one of the three components corresponds to a first portion of the measurement beam that is reflected by a surface 160 of a substrate 60, the second component corresponds to a second portion of the measurement beam that is scattered by the aperture 156 presented by a trench 150 in the plane of surface 160, and the third component corresponds to a third portion of the measurement beam that is generated as a consequence of coupling to leaky guided-wave modes of trench 150. The leaky guided waves of the excited guided-wave modes are subsequently reflected by the bottom 152 of the trench 150. The reflected fields of the excited guided-wave modes are transmitted by the trench back to the aperture 156 of the trench 150 at surface 160 and a portion thereof then transmitted at the trench aperture 156 as a radiated field of the excited guided-wave modes of trench 150. The amplitude and phase of the third component contains information about the width and depth of the trench, respectively, and about included defects.

Various different embodiments are described for the measurement of the conjugated quadratures of the third component of the return measurement beam. In certain of the embodiments, an interferometric confocal microscope is used that generates an array of measurement beams wherein each beam of the array of measurement beams is focused to form a focused spot in the image space of the interferometric confocal microscope at the substrate. The focused spot corresponds to either a symmetric image or an antisymmetric image in directions either parallel to or orthogonal to the walls of the trench. In certain other of the embodiments, an interferometric near-field confocal microscope is used that generates an array of measurement probe beams wherein each probe beam of the array of measurement probe beams is a near-field probe beam with a subwavelength dimension at the substrate surface in a direction orthogonal to the walls of the trench.

The properties of one beam of the return measurement beam comprising an array of return measurement beams are first described for a measurement beam focused to a spot above the surface of a substrate and then described for a measurement beam focused to a spot below the surface of the substrate. Shown diagrammatically in FIG. 1a is a substrate generally shown as 60 comprising surface 160 and trench 150. The sidewalls of trench 150 are 154A and 154B and the bottom of the trench 150 is 152. The aperture of trench 150 in the plane of surface 160 is indicated as 156.

Referring to FIG. 1a, a measurement beam 140 comprising beam components 140A and 140B is focused to form a spot 164 at a height $z_1$ above surface 160. The measurement beam diverges from the focused spot 164 and the first portion thereof is reflected by surface 160 to form the first component 142 of a return measurement beam wherein first component 142 comprises beam components 142A and 142B. First component 142 of the return measurement beam is a beam diverging from an object point located at longitudinal position $-z_1$.

A second portion of the measurement beam diverging from the focused spot 164 is scattered by aperture 156 to form the second component of the return measurement beam. The second component diverges from aperture 156 with the source of the second component comprising an astigmatic source. The length of the astigmatic source orthogonal to the plane of FIG. 1a is equal to $2z_1 \tan[\operatorname{asin}(NA)]$ where NA is the numerical aperture of the interferometric confocal imaging system. The planes of the astigmatic source are located in surface 160 and at a position z of $-z_1$.

A third portion of the measurement beam diverging from the focused spot 164 couples to weakly guided-wave modes of trench 150. The weakly guided waves propagate down the trench and a portion thereof is reflected back up trench 150 at the bottom 152 of trench 150 as weakly guided waves to aperture 156 where a portion thereof is radiated as the third component of the return measurement beam. The third component of the return measurement beam is formed by a source that is also astigmatic. One astigmatic plane of the source is surface 160 and the other astigmatic plane of the source is the plane located at a z position of $(-2h+z_1)$.

For the case of a beam focused to a spot below surface 160 such as shown diagrammatically in FIG. 1b, a measurement beam 240 comprising beam components 240A and 240B is focused to form a spot 168 at a height $-z_2$ below surface 160. A first portion of measurement beam 240 is reflected by surface 160 to form a focused beam at spot 170. The first portion of the measurement beam diverges from the focused spot 170 to form the first component 242 of a return measurement beam where first component 242 comprises beam components 242A and 242B. First component 242 of the return measurement beam is beam diverging from an object point located at a z position equal to $z_2$.

A second portion of the measurement beam incident on surface 160 is scattered by aperture 156 to form the second component of the return measurement beam. The second component diverges from aperture 156 with the source of the second component comprising an astigmatic source. The length of the astigmatic source orthogonal to the plane of FIG. 1b is equal to $2z_2 \tan[\operatorname{asin}(NA)]$. The astigmatic planes of the source are located in surface 160 and at a position z of $z_2$.

The third portion of the measurement beam incident on plane 160 couples to weakly guided-wave modes of trench 150. The weakly guided waves propagate down trench 150 and a portion thereof is reflected back up trench 150 at the bottom 152 of trench 150 as weakly guided waves to aperture 156 where a portion thereof is radiated as the third component of the return measurement beam. The third component of the return measurement beam is formed by a source that is also astigmatic. One astigmatic plane of the source is surface 160 and the other astigmatic plane of the source is the plane located at a z position of $(-2h+z_2)$.

There are very simple relationships between certain of the three components of return measurement beams 142 and 242 when $z_1=z_2$. The very simple relationships are a result of symmetries that are evident on inspection of FIGS. 1a and 1b. The relationships are that the first components of beams 142 and 242 are the same, the amplitudes of the second components of beams 142 and 242 are the same, and the amplitudes of the third components of beams 142 and 242 are the same. However, in the image plane comprising images formed of the respective three components, the relationships are different.

The conjugated quadratures of the first component corresponding to the first component of beam 142 that is measured when the image plane coincides with the plane in which the conjugate of spot 166 is in focus is the same as the conjugated quadratures of the first component corresponding to the first component of beam 242 that is measured when the image plane coincides with the plane in which the conjugate of spot 170 is in focus. The conjugated quadratures of the second component corresponding to the second component of beam 142 that is measured when the image plane coincides with the plane in which the conjugate of spot 166 is in focus is the same as the conjugated quadratures of the second component corresponding to the second component of beam 242 that is measured when the image plane coincides with the plane in which the conjugate of spot 170 is in focus. However, the conjugated quadratures of the third component corresponding to the third component of beam 142 that is measured when the image plane coincides with the plane in which the conjugate of spot 166 is in focus is not the same as the conjugated quadratures of the third component corresponding to the third component of beam 242 that is measured when the image plane coincides with the plane in which the conjugate of spot 170 is in focus.

The conjugated quadratures of the third components are not the same because when the image plane coincides with the plane in which the conjugate of spot 166 is in focus, the third component corresponding to the third component of beam 142 is in focus with respect to one respective astigmatic image plane and when the image plane coincides with the plane in which the conjugate of spot 170 is in focus, the third component corresponding to the third component of beam 242 is not in focus with respect to either respective astigmatic planes.

In certain embodiments, conjugated quadratures of fields corresponding to beams 142 and 242 are measured for $z_1=z_2$ and the measured sets of conjugated quadratures combined to eliminate the contributions of reflections from surface 160 and the contribution from scattering by aperture 156 to obtain a measurement of conjugated quadratures of the third components of beams 142 and 242. The measured conjugated quadratures of the third components of beams 142 and 242 contain information about the width w and depth h of trench 150 and about included defects.

Trench 150 comprises a slab wave guide of width w and an index of refraction equal to 1 if not filled or if filled with a transparent medium equal to $n_T$ that is less than the index of refraction $n_W$ of the boundary defining mediums, e.g., fused silica, silicon nitride, or silicon. Accordingly, there is $\pi$ phase shift experienced by a beam reflected at a large angle of incidence at the boundary of the slab wave guide. A direct consequence of the $\pi$ phase shift is that the complex amplitude of the electric field of the leaky guided-wave modes used in the described embodiment are equal to zero at the walls of the trench. Accordingly, the complex amplitude of the electric field of the leaky guided-wave mode may be written as $$E = j2E_0 e^{-jk_z z - \beta z + j\omega t} \cos(k_x x) \text{ where} \tag{1}$$

$$\frac{k_x w}{2} = (2p+1)\frac{\pi}{2}, \ p = 0, 1, \pm \ \ldots \ , \tag{2}$$

Figure 1C:
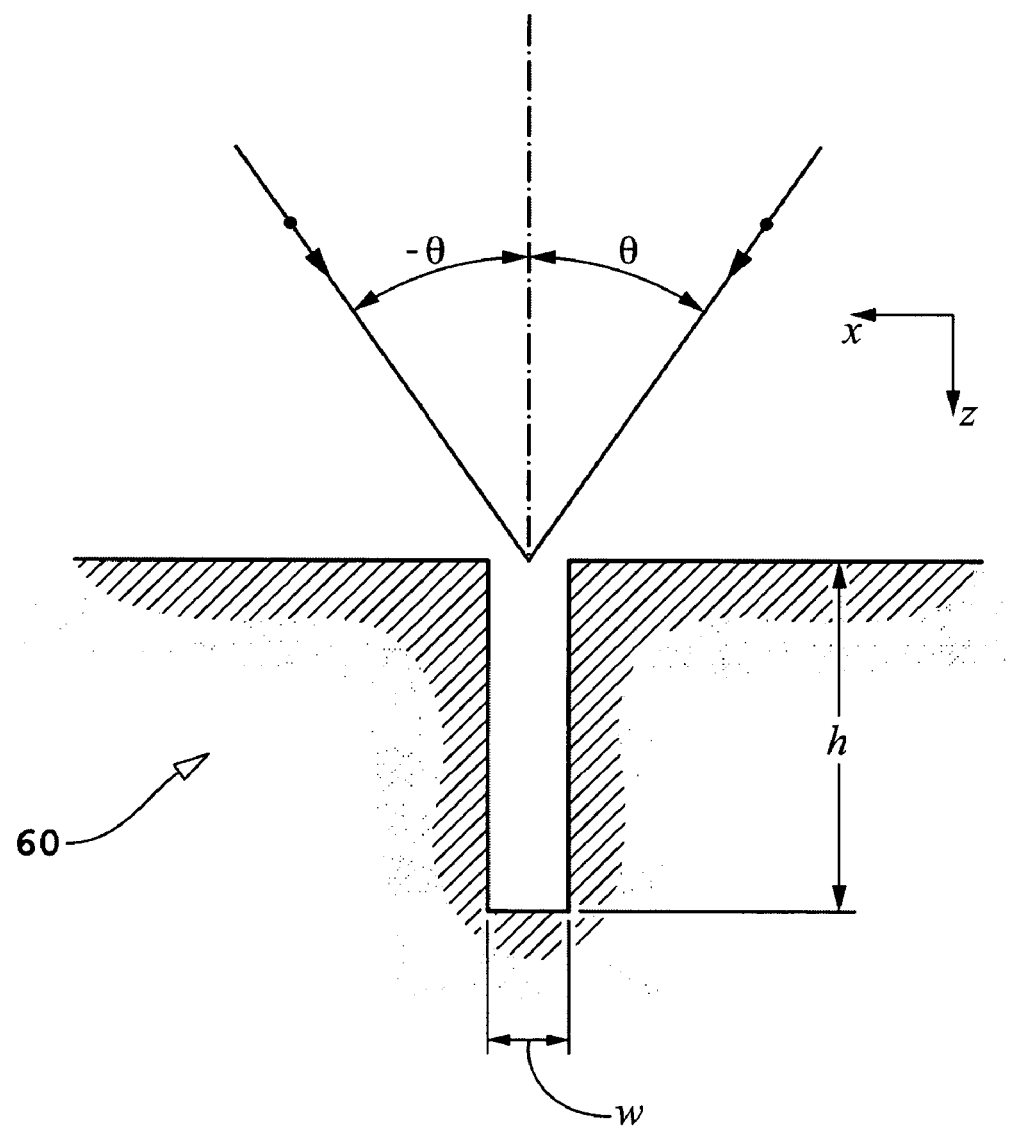

$j=\sqrt{-1}$, $k_x$ and $k_z$ are the x and z components of the real component of the wave number k, and $\beta$ is the imaginary component of wave number k. The coordinate system is shown in FIG. 1c. The spectrum of leaky guided-wave modes of interest is continuous because the index of refraction of the trench $n_T$ is less than the index of refraction $n_W$ of the boundary defining medium and because of small values of w and corresponding small values of $\theta$ defined in FIG. 1c.

Components $k_x$ and $k_z$ of complex wave number k are $$k_x = k_T \sin \theta_T \tag{3}$$

and $$k_z = k_T (\sec^2 \theta_T - \beta^2)^{1/2} \tag{4}$$

where $\sin \theta_T = \sin \theta / n_T$, $k_T = n_T k_0$, and $k_0$ is the free space wave number for the beam. For the leaky guided-wave modes of interest, the imaginary component $\beta$ due to transmission of the leaky guided waves at the boundaries of the slab wave guide is $$\beta = -\ln[R_S(\theta)]^{1/2} \frac{1}{w} \tan\theta \tag{5}$$

where $R_s(\theta)$ is the reflectivity of a beam at the boundary of the slab wave guide for s polarization of the beam with an angle of incidence equal to $[(\pi/2)-\theta]$. For the excited leaky guided-wave modes of interest, $\beta \ll |k|$ and the magnitude of the imaginary component $\beta$ affects the magnitude of $k_z$ only in second and higher order terms in $\beta$.

The optical beam incident on slab wave guide shown in FIG. 1c that will couple with a higher efficiency to a leaky guided-wave mode is one that has either a symmetric or an antisymmetric distribution of the electric field at the surface of the slab wave guide. A measurement beam used in the described embodiment is selected that has either a symmetric or antisymmetric distribution of the electric field to preferentially to excite either symmetric or antisymmetric leaky guided-wave modes of trench 150 according to the magnitude of w relative to $\lambda$ and to procedures used to eliminate effects of background beams. An approximate expression for the coupling efficiency $\zeta(\theta)$ of a beam to leaky guided-wave modes of a trench where the beam is focused at the z position 152 of the bottom of the trench is $$\zeta(\theta_{\max}) = \frac{1}{2}\left(\frac{w}{h}\right)\left(\frac{1}{\theta_{\max}}\right) \tag{6}$$

where NA is the numerical aperture and $$NA = \sin \theta_{max} \tag{7}$$

where $\theta_{max}$ is the maximum angle that a component of a return measurement beam makes with the optical axis of an interferometric confocal imaging system in the object space comprising substrate 60.

The depth resolution $\Delta Z$ of the interferometric confocal imaging system is given by the formula $$\Delta Z = \frac{1}{2}\left(\frac{1}{1-\cos\theta_{\max}}\right)\lambda \tag{8}$$

where $\lambda$ is the wavelength of the measurement and return measurement beams.

Table 1 gives values for $k/k_0$, $\beta$, $\zeta$ for $n_T=1$ and a certain set of other conditions. The range used in Table 1 for $\theta$ is $$|\theta| \leq 0.18 \tag{9}$$

corresponding to a range of aspect ratios $$\frac{w}{h} \leq 0.36 \tag{10}$$

[see Equations (8) and (9)]. The materials comprising the substrate for which results are given in Table 1 are $SiO_2$, SiN, and Si and the reflectivity $R_s$ of the s polarization is listed in Table 1 for a series of materials as a function of $|\theta|$ for $0 \leq |\theta| \leq 0.18$.

An important property of the excited leaky guided-wave modes is that the normalized z component $k_z/k_0$ of the wave number k departs from a value of 1 by less than approximately 1%. As a result of this property, it is evident that the "effective" index of refraction of the trench for leaky guided-wave modes is to a relatively high accuracy equal to 1. This property is used in converting measured conjugated quadratures to a depth h.

The property of an effective index of refraction of the trench equal to 1 to a relatively high accuracy also impacts directly on the property of the aberrations associated with the component of the return measurement beam generated by the radiated fields of the excited guided-wave modes of the trench. When there is a mismatch in the index of refraction of substrate materials and the index of refraction of the object space of the interferometric confocal microscope, there is spherical aberration introduced. As a consequence of the effective index of refraction of the trench being to a good approximation equal to 1, the component of the return measurement beam generated by the radiated fields of the excited guided-wave modes of the trench will not exhibit spherical aberration. Thus the primary aberration associated with the return measurement beam generated by the radiated fields of the excited guided-wave modes of the trench will be astigmatism.

TABLE 1

| |θ| degrees | $k_z/k_0$ $\beta = 0$ | βw $SiO_2$ | βw SiN | βw Si |
|---|---|---|---|---|
| 0 | 1.0000 | 0.000 | 0.000 | 0.000 |
| 2 | 1.0006 | 0.002 | 0.001 | 0.001 |
| 4 | 1.0024 | 0.009 | 0.005 | 0.003 |
| 6 | 1.0055 | 0.021 | 0.012 | 0.006 |
| 8 | 1.0098 | 0.037 | 0.022 | 0.010 |
| 10 | 1.0154 | 0.057 | 0.034 | 0.016 |

Wave Number Properties $n_T = 1$

The values of $\beta$ for the complex component of the wave number listed in Table 1 show that the amplitudes of the leaky guided waves of the excited guided-wave modes are attenuated in propagating in the trench but so large as to render invaluable the use of the excited guided-wave modes as a probe to properties of the trench. The values of $\beta$ for the complex component of the wave number listed in Table 1 are also of value in relating the measured conjugated quadratures of the components of the return measurement beam generated by the radiated fields of the excited guided-wave modes of the trench to the width of the trench w.

Figure 2A:
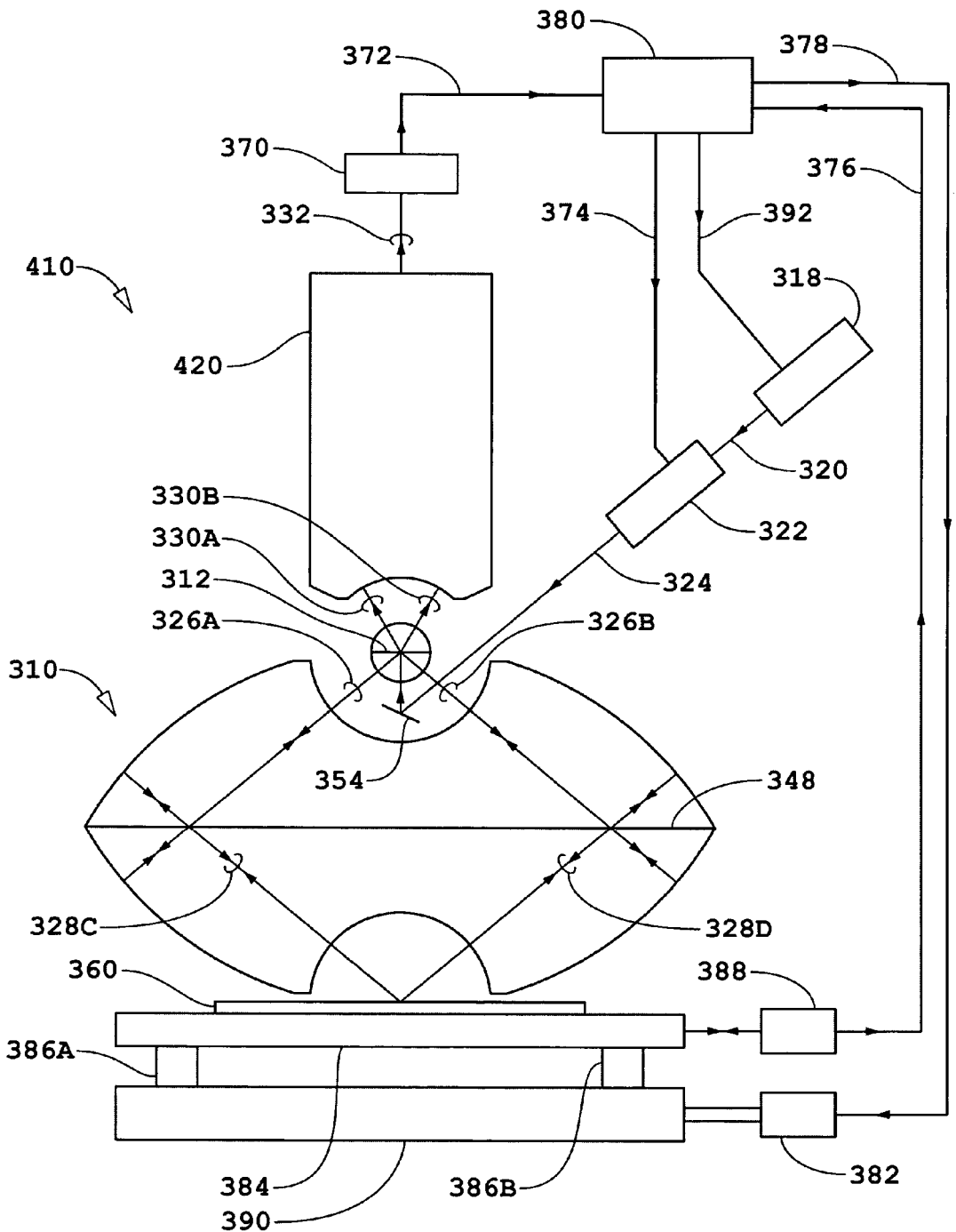
FIG. 2a is a diagrammatic representation of an interferometric imaging system that uses a catadioptric imaging system.

A first embodiment is shown schematically in FIG. 2a. The first embodiment comprises a first imaging system generally indicated as 310, pinhole beam-splitter 312, detector 370, and a second imaging system generally indicated as numeral 410. The second imaging system 410 comprises a low power microscope having a large working distance, e.g. Nikon ELWD and SLWD objectives and Olympus LWD, ULWD, and ELWD objectives. First imaging system 310 comprises an interferometric confocal microscopy system such as described in commonly owned U.S. Provisional Application No. 60/442,982 (ZI-45) entitled "Interferometric Confocal Microscopy Incorporating Pinhole Array Beam-Splitter" and U.S. patent application filed Jan. 27, 2004 also entitled "Interferometric Confocal Microscopy Incorporating Pinhole Array Beam-Splitter" both of which are by Henry A. Hill. The contents of both of the cited patent applications are herein incorporated in their entirety by reference.

Figure 2B:
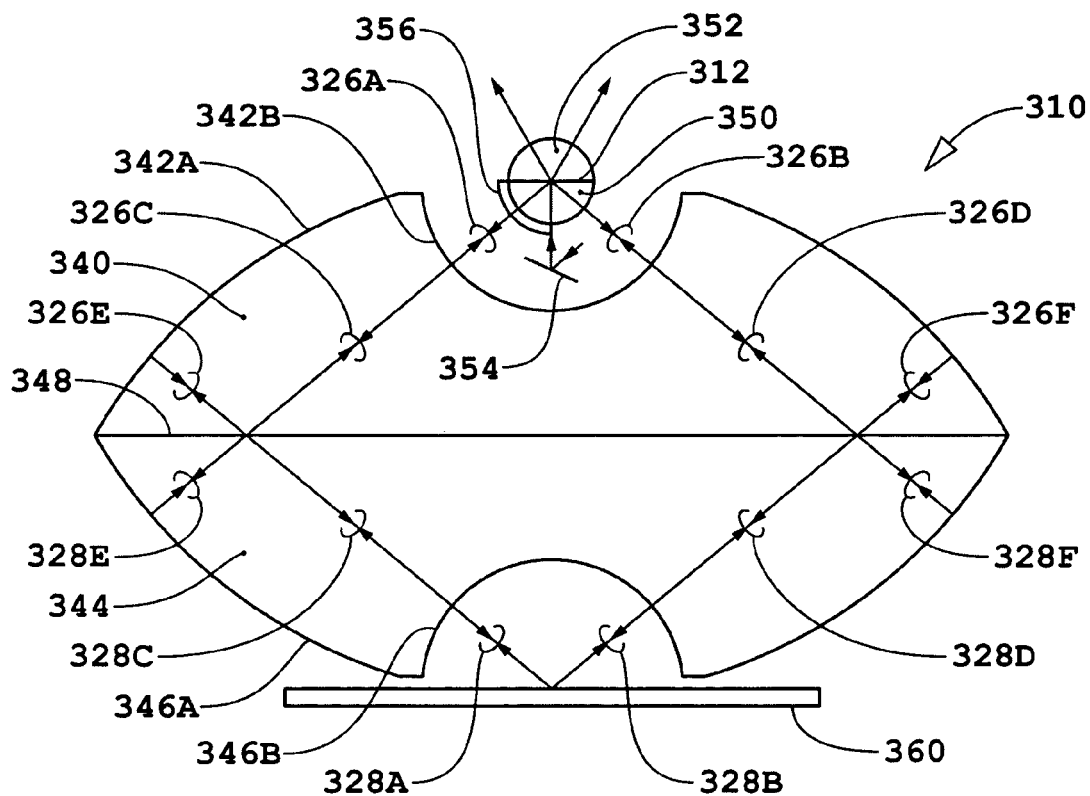
FIG. 2b is a diagrammatic representation of a catadioptric imaging system.

The first imaging system 310 is shown schematically in FIG. 2b. The imaging system 310 is a catadioptric system such as described in commonly owned U.S. Pat. No. 6,552,852 filed Dec. 20, 2001 (ZI-38) entitled "Catoptric and Catadioptric Imaging System;" U.S. Provisional Patent Application No. 10/366,651 filed Feb. 3, 2003 (ZI-43) entitled "Catoptric and Catadioptric Imaging System;" U.S. Provisional Patent Application No. 60/501,666 filed Sep. 10, 2003 [ZI-54] entitled "Catoptric and Catadioptric Imaging Systems With Adaptive Catoptric Surfaces;" and U.S. Provisional Patent Application No. 60/506,715 filed Sep. 26, 2003 [ZI-56] entitled "Catoptric and Catadioptric Imaging Systems Comprising Pellicle Beam-Splitters And Non-Adaptive And Adaptive Catoptric Surfaces" all four of which are by Henry A. Hill. The contents of the four cited applications are incorporated herein in their entirety by reference.

Catadioptric imaging system 310 comprises catadioptric elements 340 and 344, beam splitter 348, and convex lens 350. Surfaces 342A and 346A are convex spherical surfaces with nominally the same radii of curvature and the respective centers of curvature of surfaces 342A and 346A are conjugate points with respect to beam splitter 348. Surfaces 342B and 346B are concave spherical surfaces with nominally the same radii of curvature. The centers of curvature of surfaces 342B and 346B are the same as the centers of curvature of surfaces 346A and 342A, respectively. The center of curvature of convex lens 350 is the same as the center of curvature of surfaces 342B and 346A. The radius of curvature of surface 346B is selected so as to minimize the loss in efficiency of the imaging system 310 and to produce a working distance for imaging system 310 acceptable for an end use application. The radius of curvature of convex lens 350 is selected so that the off-axis aberrations of the catadioptric imaging system 310 are compensated. The medium of elements 340 and 344 may be for example fused silica or commercially available glass such as SF11. The medium of convex lens 350 may be for example fused silica, YAG, or commercially available glass such as SF11. An important consideration in the selection of the medium of elements 340 and 344 and convex lens 350 will the transmission properties for the frequencies of beam 324.

Figure 2C:
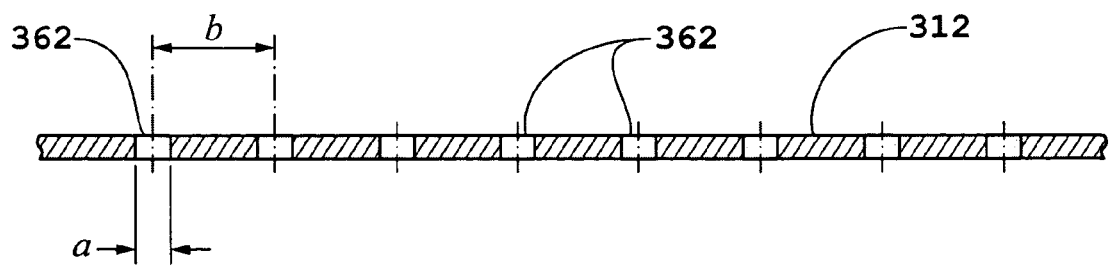
FIG. 2c is a diagrammatic representation of a pinhole array beam-splitter.

Convex lens 352 has a center of curvature the same as the center of curvature of convex lens 350. Convex lenses 350 and 352 are bonded together with pinhole beam-splitter 312 in between. Pinhole array beam-splitter 312 is shown in FIG. 2c. The pattern of pinholes in pinhole array beam-splitter is chosen to match the requirements of an end use application. An example of a pattern is a two dimensional array of equally spaced pinholes in two orthogonal directions. The pinholes may comprise circular apertures, rectangular apertures, or combinations thereof such as described in commonly owned U.S. patent application Ser. No. 09/917,402 filed Jul. 27, 2001 (ZI-15) entitled "Multiple-Source Arrays for Confocal and Near-field Microscopy" by Henry A. Hill and Kyle Ferrio of which the contents are incorporated herein in their entirety by reference. The spacing between pinholes of pinhole array beam-splitter 312 is shown in FIG. 2c as b with aperture size a.

Input beam 324 is reflected by mirror 354 to pinhole beam-splitter 312 where a first portion thereof is transmitted as reference beam components of output beam 330A and 330B and a second portion thereof scattered as measurement beam components of beams 326A and 326B. The measurement beam components 326A and 326B are imaged as components of beams 328A and 328B to an array of image spots in an image plane close to substrate 360A portion of the components of beams 328A and 328B incident on substrate 360 are reflected and/or scattered as return measurement beam components of beams 328A and 328B. Return measurement beam components of beams 328A and 328B are imaged by catadioptric imaging system 310 to spots that are coincident with the pinholes of pinhole beam-splitter 312 and a portion thereof is transmitted as return measurement beam components of output beams 330A and 330B.

The description of the imaging properties of catadioptric imaging system 310 is the same as the corresponding portion of the description given for the imaging properties of catadioptric imaging system 10 in cited U.S. Provisional Application No. 60/442,982 filed Jan. 28, 2003 (ZI-45) and U.S. patent a plication filed Jan. 27, 2004 entitled "Interferometric Confocal Microscopy Incorporating Pinhole Array Beam-Splitter".

For excitation of antisymmetric leaky guided-wave modes in a trench, an antisymmetric distribution of electric fields at each of the spots of the image spots in the image plane close to substrate 360 is generated in the first embodiment by introducing a $\pi$ phase shift between the measurement beam components of beam components 328A and 328B. The phase shift may be with respect to the plane orthogonal or parallel to the walls of a trench in substrate 360. The $\pi$ phase shift is introduced with the addition of a thin layer 356 to a portion of the convex surface of convex lens 350 such that a half wave phase or $\pi$ phase shift is generated between the measurement beam components of beams 326A and 326B (see FIG. 2b). The $\pi$ phase shift can also be introduced by the use of adaptive catoptric surfaces such as described in cited U.S. Provisional Patent Application No. 60/501,666 [ZI-54] and cited U.S. Provisional Patent Application filed Sep. 26, 2003 [ZI-56] entitled "Catoptric and Catadioptric Imaging Systems Comprising Pellicle Beam-Splitters And Non-Adaptive And Adaptive Catoptric Surfaces."

The antisymmetric distribution of electric fields in the excited leaky guided-wave modes generates components of the return measurement beams corresponding to return measurement beam components of beams 328A and 328B and accordingly of beam components 326A and 326B that have a relative phase shift of π. If these return measurement beam components were to be imaged without the half wave phase shifter 356 on convex lens 350, the electric field distributions of the spots coincident with the pinholes of pinhole beam-splitter 312 would be antisymmetric. The conjugated quadratures corresponding to an antisymmetric electric field distribution would be zero. However, because of the half wave phase shifter 356 on a portion of convex lens 350, the electric field distributions of the spots coincident with the pinholes of pinhole beam-splitter 312 are symmetric, the conjugated quadratures corresponding to a symmetric electric field distribution are not zero, and the conjugated quadratures of return measurement beam components generated by fields radiated by the excited antisymmetric leaky guided-wave modes are detected with high efficiency.

When there is a trench in substrate 360 that intercepts one of the measurement beams incident on substrate 360, the corresponding return measurement beam will comprise the three components previously described with respect to reflection by the surface, scattering by the aperture of the trench, and coupling to leaky guided-wave modes of the trench.

The next step is the imaging of output beam components 330A and 330B by imaging system 410 to an array of spots that coincide with the pixels of a multi-pixel detector such as a CCD to generate an array of electrical interference signals 372. The array of electrical interference signals is transmitted to signal processor and controller 380 for subsequent processing. (Note: Signal processor and controller 380 is programmed to automate the process of operating the system, collecting the measurements, and analyzing the measurements in the manner described herein.) In certain end use applications, where the magnification of imaging system 410 is 1 and either single- or bi-homodyne detection methods are used, imaging system 420 and convex lens 352 can be removed and detector 370 placed adjacent to pinhole array beam-splitter 312.

The description of input beam 324 is the same as corresponding portions of the description given for input beam 24 of cited U.S. Provisional Application No. 60/442,982 [ZI-45] and cited U.S. patent application filed Jan. 27, 2004 (ZI-45) entitled "Interferometric Confocal Microscopy Incorporating Pinhole Array Beam-Splitter" with beam-conditioner 322 configured as a two-frequency generator and frequency-shifter. Input beam 324 comprises two components that have different frequencies and have the same state of plane polarization. The frequency of each component of input beam 324 is shifted between two different frequency values by beam-conditioner 322 according to control signal 374 generated by electronic processor and controller 380. Source 318 of input beam 320 to frequency-shifter 322, such as a laser, can be any of a variety of single frequency lasers.

The conjugated quadratures of fields of the return measurement beams are obtained using either single-, double-, bi- or quad-homodyne detection methods such as described in cited commonly owned No. 60/442,982 (ZI-45) and U.S. patent application filed Jan. 27, 2004 (ZI-45) entitled "Interferometric Confocal Microscopy Incorporating Pinhole Array Beam-Splitter." The bi- and quad-homodyne detection methods are also described in commonly owned U.S. Provisional Application No. 60/442,858 filed Jan. 27, 2003 (ZI-47) entitled "Apparatus and Method for Joint Measurements of Conjugated Quadratures of Fields of Reflected/ Scattered Beams by an Object in Interferometry" and U.S. patent application filed Jan. 27, 2004 (ZI-47) and entitled "Apparatus and Method for Joint Measurements of Conjugated Quadratures of Fields of Reflected/Scattered and Transmitted Beams by an Object in Interferometry" both of which are by Henry A. Hill and of which the contents are herein incorporated in their entirety by reference. In the determination of the conjugated quadratures of fields, sets of four measurements of the electrical interference signals 372 are made. For each of the set of four measurements of the electrical interference signals 372, a known sequence of phase shifts is introduced between the reference beam component and the return measurement beam component of output beam components 330A and 330B.

Referring to the bi-homodyne detection method used in various embodiments, a set of four electrical interference signal values are obtained for each spot on and/or in substrate 60 being imaged. The set of four electrical interference signal values $S_j$, j=1,2,3,4, used for obtaining conjugated quadratures of fields for a single a spot on and/or in a substrate being imaged is represented for the bi-homodyne detection within a scale factor by the formula $$S_j = P_j \begin{Bmatrix} \xi_j^2|A_1|^2 + \zeta_j^2|B_1|^2 + \eta_j^2|C_1|^2 + \\ \zeta_j\eta_j 2|B_1||C_1|\cos\varphi_{B_1C_1\varepsilon_j} + \\ \xi_j\zeta_j 2|A_1||B_1|\cos\varphi_{A_1B_1\varepsilon_j} + \\ \varepsilon_j\xi_j\eta_j 2|A_1||C_1|\cos\varphi_{A_1C_1} + \xi_j^2|A_2|^2 + \\ \zeta_j^2|B_2|^2 + \eta_j^2|C_2|^2 + \\ \zeta_j\eta_j 2|B_2||C_2|\cos\varphi_{B_2C_2\gamma_j} + \\ \xi_j\zeta_j 2|A_2||B_2|\cos\varphi_{A_2B_2\gamma_j} + \\ \gamma_j\xi_j\eta_j 2|A_2||C_2|\cos\varphi_{A_2C_2} \end{Bmatrix} \quad (11)$$

where coefficients $A_1$ and $A_2$ represent the amplitudes of the reference beams corresponding to the first and second frequency components of the input beam; coefficients $B_1$ and $B_2$ represent the amplitudes of background beams corresponding to reference beams $A_1$ and $A_2$, respectively; coefficients $C_1$ and $C_2$ represent the amplitudes of the return measurement beams corresponding to reference beams $A_1$ and $A_2$, respectively; $P_j$ represents the integrated intensity of the first frequency component of the input beam in pulse j of the pulse sequence; and the values for $\in_j$ and $\gamma_j$ are listed in Table 2. The change in the values of $\in_j$ and $\gamma_j$ from 1 to −1 or from −1 to 1 correspond to changes in relative phases of respective reference and measurement beams. The coefficients $\xi_j$, $\zeta_j$, and $\eta_j$ represent effects of variations in properties of a conjugate set of four pinholes such as size and shape if used in the generation of the spot on and/or in substrate 360 and the sensitivities of a conjugate set of four detector pixels corresponding to the spot on and/or in substrate 360 for the reference beam, the background beam, and the return measurement beam, respectively.

TABLE 2

| j | $\epsilon_j$ | $\gamma_j$ | $\epsilon_j\gamma_j$ |
|---|---|---|---|
| 1 | 1 | 1 | 1 |
| 2 | −1 | −1 | 1 |
| 3 | −1 | 1 | −1 |
| 4 | 1 | −1 | −1 |

It is assumed in Equation (11) that the ratio of $|A_2|/|A_1|$ is not dependent on j or on the value of $P_j$. In order to simplify the representation of $S_j$ so as to project the important features without departing from either the scope or spirit of the present invention, it is also assumed in Equation (11) that the ratio of the amplitudes of the return measurement beams corresponding to $A_2$ and $A_1$ is not dependent on j or on the value of $P_j$. However, the ratio $|C_2|/|C_1|$ will be different from the ratio $|A_2|/|A_1|$ when the ratio of the amplitudes of the measurement beam components corresponding to $A_2$ and $A_1$ are different from the ratio $|A_2|/|A_1|$.

Noting that $\cos \phi_{A_2C_2} = \pm \sin \phi_{A_1C_1}$ by the control of the relative phase shifts between corresponding reference and return measurement beam components in beam 32, Equation (11) may be rewritten as $$S_j = P_j \left\{ \begin{array}{l} \xi_j^2(|A_1|^2+|A_2|^2) + \zeta_j^2(|B_1|^2+|B_2|^2) + \\ \eta_j^2(|C_1|^2+|C_2|^2) + 2\xi_j\zeta_j(|A_1||B_1|\cos\varphi_{A_1B_1\varepsilon_j} + \\ |A_2||B_2|\cos\varphi_{A_2B_2\gamma_j}) + 2\xi_j\eta_j[\varepsilon_j|A_1||C_1|\cos\varphi_{A_1C_1} + \\ \gamma_j\left(\frac{|A_2|}{|A_1|}\right)\left(\frac{|C_2|}{|C_1|}\right)|A_1||C_1|\sin\varphi_{A_1C_1}] + \\ 2\zeta_j\eta_j(\varepsilon_j|B_1||C_1|\cos\varphi_{B_1C_1\varepsilon_j} + \\ \gamma_j|B_2||C_2|\cos\varphi_{B_2C_2\gamma_j}) \end{array} \right\} \quad (12)$$

where the relationship $\cos \phi_{A_2C_2} = \sin \phi_{A_1C_1}$ has been used without departing from either the scope or spirit of the present invention.

The change in phase $\phi_{A_1B_1\in_j}$ for a change in $\in_j$ and the change in phase $\phi_{A_2B_2\gamma_j}$ for a change in $\gamma_j$ may be different from $\pi$ in embodiments depending on where and how the background beam is generated. It may be of value in evaluating the effects of the background beams to note that the factor $\cos \phi_{B_1C_1\in_j}$ may be written as $\cos [\phi_{A_1C_1} + (\phi_{B_1C_1\in_j} - \phi_{A_1C_1})]$ where the phase difference $(\phi_{B_1C_1\in_j} - \phi_{A_1C_1})$ is the same as the phase $\phi_{A_1B_1\in_j}$, i.e., $\cos \phi_{B_1C_1\in_j} = \cos (\phi_{A_1C_1} + \phi_{A_1B_1\in_j})$.

It is evident from inspection of Equation (12) that the term in Equation (12) corresponding to the component of conjugated quadratures $|C_1|\cos \phi_{A_1C_1}$ is a rectangular function that has a mean value of zero and is symmetric about j=2.5 since $\in_j$ is symmetric about j=2.5. In addition the term in Equation (12) corresponding to the component of conjugated quadratures $|C_1|\sin \phi_{A_1C_1}$ in Equation (12) is a rectangular function that has a mean value of zero and is antisymmetric about j=2.5 since $\gamma_j$ is a antisymmetric function about j=2.5. Another important property by the design of the bi-homodyne detection method is that the conjugated quadratures $|C_1|\cos \phi_{A_1C_1}$ and $|C_1|\sin \phi_{A_1C_1}$ terms are orthogonal over the range of j=1, 2, 3, 4 since $\in_j$ and $\gamma_j$ are orthogonal over the range of j=1, 2, 3, 4, i.e., $\sum_{j=1}^{4} \in_j \gamma_j = 0$.

Information about conjugated quadratures $|C_1|\cos \phi_{A_1C_1}$ and $|C_1|\sin \phi_{A_1C_1}$ are obtained using the symmetric and antisymmetric properties and orthogonality property of the conjugated quadratures terms in Equation (12) as represented by the following digital filters applied to the signal values $S_j$:

$$F_1(S) = \sum_{j=1}^{4} \varepsilon_j \frac{S_j}{P_j' \xi_j'^2} \quad (13)$$

$$= (|A_1|^2 + |A_2|^2) \sum_{j=1}^{4} \varepsilon_j \left(\frac{P_j}{P_j'}\right)\left(\frac{\xi_j^2}{\xi_j'^2}\right) +$$

$$(|B_1|^2 + |B_2|^2) \sum_{j=1}^{4} \varepsilon_j \left(\frac{P_j}{P_j'}\right)\left(\frac{\zeta_j^2}{\xi_j'^2}\right) +$$

$$(|C_1|^2 + |C_2|^2) \sum_{j=1}^{4} \varepsilon_j \left(\frac{P_j}{P_j'}\right)\left(\frac{\eta_j^2}{\xi_j'^2}\right) +$$

$$2|A_1||C_1|\cos\varphi_{A_1C_1} \sum_{j=1}^{4} \left(\frac{P_j}{P_j'}\right)\left(\frac{\xi_j\eta_j}{\xi_j'^2}\right) +$$

$$2\left(\frac{|A_2|}{|A_1|}\right)\left(\frac{|C_2|}{|C_1|}\right)|A_1||C_1|\sin\varphi_{A_1C_1} \sum_{j=1}^{4} \varepsilon_j \gamma_j \left(\frac{P_j}{P_j'}\right)\left(\frac{\xi_j\eta_j}{\xi_j'^2}\right) +$$

$$2|A_1||B_1| \sum_{j=1}^{4} \varepsilon_j \left(\frac{P_j}{P_j'}\right)\left(\frac{\xi_j\zeta_j}{\xi_j'^2}\right) \cos\varphi_{A_1B_1\varepsilon_j} +$$

$$2|A_2||B_2| \sum_{j=1}^{4} \varepsilon_j \left(\frac{P_j}{P_j'}\right)\left(\frac{\xi_j\zeta_j}{\xi_j'^2}\right) \cos\varphi_{A_2B_2\varepsilon_j} +$$

$$2|B_1||C_1| \sum_{j=1}^{4} \left(\frac{P_j}{P_j'}\right)\left(\frac{\zeta_j\eta_j}{\xi_j'^2}\right) \cos\varphi_{B_1C_1\varepsilon_j} +$$

$$2|B_2||C_2| \sum_{j=1}^{4} \varepsilon_j \gamma_j \left(\frac{P_j}{P_j'}\right)\left(\frac{\zeta_j\eta_j}{\xi_j'^2}\right) \cos\varphi_{B_2C_2\varepsilon_j},$$

$$F_2(S) = \sum_{j=1}^{4} \gamma_j \frac{S_j}{P_j' \xi_j'^2} \quad (14)$$

$$= (|A_1|^2 + |A_2|^2) \sum_{j=1}^{4} \gamma_j \left(\frac{P_j}{P_j'}\right)\left(\frac{\xi_j^2}{\xi_j'^2}\right) +$$

$$(|B_1|^2 + |B_2|^2) \sum_{j=1}^{4} \gamma_j \left(\frac{P_j}{P_j'}\right)\left(\frac{\zeta_j^2}{\xi_j'^2}\right) +$$

$$(|C_1|^2 + |C_2|^2) \sum_{j=1}^{4} \gamma_j \left(\frac{P_j}{P_j'}\right)\left(\frac{\eta_j^2}{\xi_j'^2}\right) +$$

$$2|A_1||C_1|\cos\varphi_{A_1C_1} \sum_{j=1}^{4} \varepsilon_j \gamma_j \left(\frac{P_j}{P_j'}\right)\left(\frac{\xi_j\eta_j}{\xi_j'^2}\right) +$$

$$2\left(\frac{|A_2|}{|A_1|}\right)\left(\frac{|C_2|}{|C_1|}\right)|A_1||C_1|\sin\varphi_{A_1C_1} \sum_{j=1}^{4} \left(\frac{P_j}{P_j'}\right)\left(\frac{\xi_j\eta_j}{\xi_j'^2}\right) +$$

$$2|A_1||B_1| \sum_{j=1}^{4} \gamma_j \left(\frac{P_j}{P_j'}\right)\left(\frac{\xi_j\zeta_j}{\xi_j'^2}\right) \cos\varphi_{A_1B_1\varepsilon_j} +$$

$$2|A_2||B_2| \sum_{j=1}^{4} \gamma_j \left(\frac{P_j}{P_j'}\right)\left(\frac{\xi_j\zeta_j}{\xi_j'^2}\right) \cos\varphi_{A_2B_2\gamma_j} +$$

$$2|B_1||C_1| \sum_{j=1}^{4} \varepsilon_j \gamma_j \left(\frac{P_j}{P_j'}\right)\left(\frac{\zeta_j\eta_j}{\xi_j'^2}\right) \cos\varphi_{B_1C_1\varepsilon_j} +$$

$$2|B_2||C_2| \sum_{j=1}^{4} \left(\frac{P_j}{P_j'}\right)\left(\frac{\zeta_j\eta_j}{\xi_j'^2}\right) \cos\varphi_{B_2C_2\gamma_j}$$

where $\xi_j'$ and $P_j'$ are values used in the digital filters to represent $\xi_j$ and $P_j$.

The parameter $$\left[\left(\frac{|A_2|}{|A_1|}\right)\left(\frac{|C_2|}{|C_1|}\right)\right] \quad (15)$$

in Equations (13) and (14) needs to be determined in order complete the determination of a conjugated quadratures. The parameter given in Equation (15) can be measured for example by introducing $\pi/2$ phase shifts into the relative phase of the reference beam and the measurement beam and repeating the measurement for the conjugated quadratures. The ratio of the amplitudes of the conjugated quadratures corresponding to (sin $\phi_{A_1C_1}$/cos $\phi_{A_1C_1}$) from the first measurement divided by the ratio of the amplitudes of the conjugated quadratures corresponding to (sin $\phi_{A_1C_1}$/cos $\phi_{A_1C_1}$) from the second measurement is equal to $$\left[\left(\frac{|A_2|}{|A_1|}\right)\left(\frac{|C_2|}{|C_1|}\right)\right]^2. \quad (16)$$

Note that certain of the factors in Equations (13) and (14) have nominal values of 4 within a scale factors, e.g., $$\sum_{j=1}^{4}\left(\frac{P_j}{P'_j}\right)\left(\frac{\xi_j\eta_j}{\xi_j'^2}\right) \simeq 4, \quad \sum_{j=1}^{4}\left(\frac{P_j}{P'_j}\right)\left(\frac{\zeta_j\eta_j}{\xi_j'^2}\right) \simeq 4. \quad (17)$$

The scale factors correspond to the average values for the ratios of $\xi'_j/\eta_j$ and $\xi'_j/\zeta_j$, respectively, assuming that the average value of $P_j/P'_j \cong 1$. Certain other of the factors in Equations (13) and (14) have nominal values of zero, e.g., $$\sum_{j=1}^{4}\varepsilon_j\left(\frac{P_j}{P'_j}\right)\left(\frac{\xi_j^2}{\xi_j'^2}\right) \simeq 0, \quad \sum_{j=1}^{4}\varepsilon_j\left(\frac{P_j}{P'_j}\right)\left(\frac{\zeta_j^2}{\xi_j'^2}\right) \simeq 0,$$

$$\sum_{j=1}^{4}\varepsilon_j\left(\frac{P_j}{P'_j}\right)\left(\frac{\eta_j^2}{\xi_j'^2}\right) \simeq 0, \quad \sum_{j=1}^{4}\gamma_j\left(\frac{P_j}{P'_j}\right)\left(\frac{\xi_j^2}{\xi_j'^2}\right) \simeq 0,$$

$$\sum_{j=1}^{4}\gamma_j\left(\frac{P_j}{P'_j}\right)\left(\frac{\zeta_j^2}{\xi_j'^2}\right) \simeq 0, \quad \sum_{j=1}^{4}\gamma_j\left(\frac{P_j}{P'_j}\right)\left(\frac{\eta_j^2}{\xi_j'^2}\right) \simeq 0,$$

$$\sum_{j=1}^{4}\varepsilon_j\gamma_j\left(\frac{P_j}{P'_j}\right)\left(\frac{\xi_j\eta_j}{\xi_j'^2}\right) \simeq 0. \quad (18)$$

The remaining factors, $$\sum_{j=1}^{4}\varepsilon_j\left(\frac{P_j}{P'_j}\right)\left(\frac{\xi_j\zeta_j}{\xi_j'^2}\right)\cos\varphi_{A_1B_1\varepsilon_j}, \quad (19)$$

$$\sum_{j=1}^{4}\varepsilon_j\left(\frac{P_j}{P'_j}\right)\left(\frac{\xi_j\zeta_j}{\xi_j'^2}\right)\cos\varphi_{A_2B_2\gamma_j},$$

$$\sum_{j=1}^{4}\left(\frac{P_j}{P'_j}\right)\left(\frac{\zeta_j\eta_j}{\xi_j'^2}\right)\cos\varphi_{B_1C_1\varepsilon_j},$$

$$\sum_{j=1}^{4}\varepsilon_j\gamma_j\left(\frac{P_j}{P'_j}\right)\left(\frac{\zeta_j\eta_j}{\xi_j'^2}\right)\cos\varphi_{B_2C_2\gamma_j},$$

$$\sum_{j=1}^{4}\gamma_j\left(\frac{P_j}{P'_j}\right)\left(\frac{\xi_j\zeta_j}{\xi_j'^2}\right)\cos\varphi_{A_1B_1\varepsilon_j},$$

$$\sum_{j=1}^{4}\gamma_j\left(\frac{P_j}{P'_j}\right)\left(\frac{\xi_j\zeta_j}{\xi_j'^2}\right)\cos\varphi_{A_2B_2\gamma_j},$$

$$\sum_{j=1}^{4}\varepsilon_j\gamma_j\left(\frac{P_j}{P'_j}\right)\left(\frac{\zeta_j\eta_j}{\xi_j'^2}\right)\cos\varphi_{B_1C_1\varepsilon_j},$$

$$\sum_{j=1}^{4}\left(\frac{P_j}{P'_j}\right)\left(\frac{\zeta_j\eta_j}{\xi_j'^2}\right)\cos\varphi_{B_2C_2\gamma_j},$$

will have nominal magnitudes ranging from approximately zero to approximately 4 times a cosine factor and either the average value of factor $(P_j/P'_j)(\xi'_j\zeta_j/\xi_j'^2)$ or $(P_j/P'_j)(\zeta_j\eta_j/\xi_j'^2)$ depending on the properties respective phases. For the portion of the background with phases that do not track to a first approximation the phases of the respective measurement beams, the magnitudes of all of the terms listed in the Equation (19) will be approximately zero. For the portion of the background with phases that do track to a first approximation the phases of the respective measurement beams, the magnitudes of the terms listed in Equation (19) will be approximately 4 times a cosine factor and either the average value of factor $(P_j/P'_j)(\xi'_j\zeta_j/\xi_j'^2)$ and or factor $(P_j/P'_j)(\zeta_j\eta_j/\xi_j'^2)$.

The two largest terms in Equations (13) and (14) are generally the terms that have the factors $(|A_1|^2+|A_2|^2)$ and $(|B_1|^2+|B_2|^2)$. However, the corresponding terms are substantially eliminated by selection of $\xi'_j$ values for the terms that have $(|A_1|^2+|A_2|^2)$ as a factor and by the design of $\zeta_j$ values for the terms that have $(|B_1|^2+|B_2|^2)$ as a factor as shown in Equation (18).

The largest contribution from effects of background is represented by the contribution to the interference term between the reference beam and the portion of the background beam generated by the measurement beam. This portion of the effect of the background can be measured by measuring the corresponding conjugated quadratures of the portion of the background with the return measurement beam component of beam 332 set equal to zero, i.e., measuring the respective electrical interference signals $S_j$ with substrate 360 removed and with either $|A_2|=0$ or $|A_1|=0$ and visa versa. The measured conjugated quadratures of the portion of the effect of the background can than used to compensate for the respective background effects beneficially in an end use application if required.

Information about the largest contribution from effects of background amplitude $2\xi_j\zeta_j|A_1||B_1|$ and phase $\phi_{A_1B_1\varepsilon_j}$, i.e., the interference term between the reference beam and the portion of background beam generated by the measurement beam, may be obtained by measuring $S_j$ for j=1, 2, 3, 4 as a function of relative phase shift between reference beam and the measurement beam with substrate 360 removed and either $|A_2|=0$ or $|A_1|=0$ and visa versa and Fourier analyzing the measured values of $S_j$. Such information can be used to help identify the origin of the respective background.

Other techniques may be incorporated to reduce and/or compensate for the effects of background beams without departing from either the scope or spirit of the present invention such as described in commonly owned U.S. Pat. No. 5,760,901 entitled "Method And Apparatus For Confocal Interference Microscopy With Background Amplitude Reduction and Compensation," U.S. Pat. No. 5,915,048 entitled "Method and Apparatus for Discrimination In-Focus Images from Out-of-Focus Light Signals from Background and Foreground Light Sources," and U.S. Pat. No. 6,480,285 B1 wherein each of three patents are by Henry A. Hill. The contents of each of the three cited patents are herein incorporated in their entirety by reference.

The selection of values for $\xi'_j$ is based on information about coefficients $\xi_j$ for j=1, 2, 3, 4 that may be obtained by measuring the $S_j$ for j=1, 2, 3, 4 with only the reference beam present in the interferometer system. In certain embodiments, this may correspond simply blocking the measurement beam components of input beam 24 and in certain other embodiments, this may correspond to simply measuring the $S_j$ for j=1, 2, 3, 4 with substrate 60 removed. A test of the correctness of a set of values for $\xi'_j$ is the degree to which the $(|A_1|^2+|A_2|^2)$ terms in Equations (13) and (14) are zero.

Information about coefficients $\xi_j \eta_j$ for j=1, 2, 3, 4 may be obtained by scanning an artifact past the spots corresponding to the respective four conjugate detector pixels with either $|A_2|=0$ or $|A_1|=0$ and measuring the conjugated quadratures component $2|A_1||C_1|\cos\phi_{A_1 C_1}$ or $2|A_1||C_1|\sin\phi_{A_1 C_1}$, respectively. A change in the amplitude of the $2|A_1||C_1|\cos\phi_{A_1 C_1}$ or $2|A_1||C_1|\sin\phi_{A_1 C_1}$ term corresponds to a variation in $\xi_j \eta_j$ as a function of j. Information about the coefficients $\xi_j \eta_j$ for j=1, 2, 3, 4 may be used for example to monitor the stability of one or more elements of interferometer system 310.

The bi-homodyne detection method is a robust technique for the determination of conjugated quadratures of fields. First, the conjugated quadratures $|C_1|\cos\phi_{A_1 C_1}$ and $|C_1|\sin\phi_{A_1 C_1}$ are the primary terms in the digitally filtered values $F_1(S)$ and $F_2(S)$, respectively, as expressed by Equations (13) and (14), respectively, since as noted in the discussion with respect to Equation (18), the terms with the factors $(|A_1|^2+|A_2|^2)$ and $(|B_1|^2+|B_2|^2)$ are substantially zero.

Secondly, the coefficients of $|C_1|\cos\phi_{A_1 C_1}$ and $|C_2|\sin\phi_{A_1 C_1}$ terms in Equations (13) and (14) are identical. Thus highly accurate measurements of the interference terms between the return measurement beam and the reference beam with respect to amplitudes and phases, i.e., highly accurate measurements of conjugated quadratures of fields can be measured wherein first order variations in $\xi_j$ and first order errors in normalizations such as $(P_j/P'_j)$ and $(\xi_j^2/\xi'^2_j)$ enter in only second or higher order. This property translates into a significant advantage. Also, the contributions to each component of the conjugated quadratures $|C_1|\cos\phi_{A_1 C_1}$ and $|C_2|\sin\phi_{A_1 C_1}$ from a respective set of four electrical interference signal values have the same window function and thus are obtained as jointly determined values.

Other distinguishing features of the bi-homodyne technique are evident in Equations (13) and (14): the coefficients of the conjugated quadratures $|C_1|\cos\phi_{A_1 C_1}$ and $|C_1|\sin\phi_{A_1 C_1}$ in Equations (13) and (14), respectively, corresponding to the first equation of Equations (17) are identical independent of errors in assumed values for $\xi'_j$; the coefficients of the conjugated quadratures $|C_1|\sin\phi_{A_1 C_1}$ and $|C_1|\cos\phi_{A_1 C_1}$ in Equations (13) and (14), respectively, corresponding to the fourth equation of Equations (18) are identical independent of errors in assumed values for $\xi'_j$. Thus highly accurate values of the phases corresponding to conjugated quadratures can be measured with first order variations in $\xi_j$ and first order errors in normalizations such as $(P_j/P'_j)$ and $(\xi_j^2/\xi'^2_j)$ enter in only through some high order effect.

It is also evident that since the conjugated quadratures of fields are obtained jointly when using the bi-homodyne detection method, there is a significant reduction in the potential for an error in tracking phase as a result of a phase redundancy unlike the situation possible in single-homodyne detection of conjugated quadratures of fields.

There are a number of advantages of the bi-homodyne detection method as a consequence of the conjugated quadratures of fields being jointly acquired quantities. One advantage is a reduced sensitivity the effects of an overlay error of a spot in or on the substrate that is being imaged and a conjugate image of conjugate pixel of a multipixel detector during the acquisition of four electrical interference signal values of each spot in and/or on a substrate imaged using interferometric far-field and/or near-field confocal microscopy. Overlay errors are errors in the set of four conjugate images of a respective set of conjugate detector pixels relative to the spot being imaged.

Another advantage is that when operating in the scanning mode there is a reduced sensitivity to effects of pinhole-to-pinhole variations in properties of a conjugate set of pinholes used in a confocal microscopy system that are conjugate to a spot in or on the substrate being imaged at different times during the scan.

Another advantage is that when operating in the scanning mode there is a reduced sensitivity to effects of pixel-to-pixel variation of properties within a set of conjugate pixels that are conjugate to a spot in or on the substrate being imaged at different times during the scan.

Another advantage is that when operating in the scanning mode there is reduced sensitivity to effects of pulse sequence to pulse sequence variations of a respective conjugate set of pulse sequences of the input beam 324 to the interferometer system.

The pinholes and pixels of a multipixel detector of a set of conjugate pinholes and conjugate pixels of a multipixel detector may comprise contiguous pinholes of an array of pinholes and/or contiguous pixels of a multipixel detector or may comprise selected pinholes from an array of pinholes and/or pixels from an array of pixels wherein the separation between the selected pinholes is an integer number of pinhole spacings and the separation between an array of respective pixels corresponds to an integer number of pixel spacings without loss of lateral and/or longitudinal resolution and signal-to-noise ratios. The corresponding scan rate would be equal to the integer times the spacing of spots on the measurement object 360 conjugate to set of conjugate pinholes and/or set of conjugate pixels divided by the read out rate of the multipixel detector. This property permits a significant increase in throughput for an interferometric far-field or near-field confocal microscope with respect to the number of spots in and/or on a substrate imaged per unit time.

The sequence of phase shifts is generated in the first embodiment by shifting the frequencies of components of input beam 324 by beam-conditioner 322. There is a difference in optical path length between the reference beam components and the return beam components of output beam components 330A and 330B and as a consequence, a change in frequencies of components of input beam 324 will generate corresponding phase shifts between the reference beam components and the return beam components of output beam components 330A and 330B. For an optical path difference L between the reference beam components and the return beam components of output beam components 330A and 330B, there will be for a frequency shift Δf a corresponding phase shift φ where $$\varphi = 2\pi L\left(\frac{\Delta f}{c}\right) \quad (20)$$

and c is the free space speed of light. Note that L is not a physical path length difference and depends for example on the average index of refraction of the measurement beam and the return measurement beam paths. For an example of a phase shift φ=π/2 and a value of L=0.25 m, the corresponding frequency shift Δf=300 MHz.

Referring to the quad-homodyne detection method used in described embodiments, a set of four electrical interference signal values are obtained for each spot on and/or in substrate 360 being imaged with two pulse sequences from source 318 and beam conditioner 322. The set of four electrical interference signal values $S_j$, j=1, 2, 3, 4 used for obtaining conjugated quadratures of fields for a single a spot on and/or in a substrate being imaged is represented for the quad-homodyne detection within a scale factor by the formulae $$S_1 = P_1 \begin{Bmatrix} \xi_1^2|A_1|^2 + \zeta_1^2|B_1|^2 + \eta_1^2|C_1|^2 + \zeta_1\eta_1 2|B_1||C_1|\cos\varphi_{B_1C_1\varepsilon_1} + \\ \xi_1\zeta_1 2|A_1||B_1|\cos\varphi_{A_1B_1\varepsilon_1} + \varepsilon_1\xi_1\eta_1 2|A_1||C_1|\cos\varphi_{A_1C_1} + \\ \xi_1^2|A_2|^2 + \zeta_1^2|B_2|^2 + \eta_1^2|C_2|^2 + \zeta_1\eta_1 2|B_2||C_2|\cos\varphi_{B_2C_2\gamma_1} + \\ \xi_1\zeta_1 2|A_2||B_2|\cos\varphi_{A_2B_2\gamma_1} + \gamma_1\xi_1\eta_1 2|A_2||C_2|\cos\varphi_{A_2C_2} \end{Bmatrix}, \quad (21)$$

$$S_2 = P_1 \begin{Bmatrix} \xi_2^2|A_3|^2 + \zeta_2^2|B_3|^2 + \eta_2^2|C_3|^2 + \zeta_2\eta_2 2|B_3||C_3|\cos\varphi_{B_3C_3\varepsilon_2} + \\ \xi_2\zeta_2 2|A_3||B_3|\cos\varphi_{A_3B_3\varepsilon_2} + \varepsilon_2\xi_2\eta_2 2|A_3||C_3|\cos\varphi_{A_3C_3} + \\ \xi_2^2|A_4|^2 + \zeta_2^2|B_4|^2 + \eta_2^2|C_4|^2 + \zeta_2\eta_2 2|B_4||C_4|\cos\varphi_{B_4C_4\gamma_2} + \\ \xi_2\zeta_2 2|A_4||B_4|\cos\varphi_{A_4B_4\gamma_2} + \gamma_2\xi_2\eta_2 2|A_4||C_4|\cos\varphi_{A_4C_4} \end{Bmatrix}, \quad (22)$$

$$S_3 = P_2 \begin{Bmatrix} \xi_1^2|A_1|^2 + \zeta_1^2|B_1|^2 + \eta_1^2|C_1|^2 + \zeta_1\eta_1 2|B_1||C_1|\cos\varphi_{B_1C_1\varepsilon_3} + \\ \xi_1\zeta_1 2|A_1||B_1|\cos\varphi_{A_1B_1\varepsilon_3} + \varepsilon_3\xi_1\eta_1 2|A_1||C_1|\cos\varphi_{A_1C_1} + \\ \xi_1^2|A_2|^2 + \zeta_1^2|B_2|^2 + \eta_1^2|C_2|^2 + \zeta_1\eta_1 2|B_2||C_2|\cos\varphi_{B_2C_2\gamma_3} + \\ \xi_1\zeta_1 2|A_2||B_2|\cos\varphi_{A_2B_2\gamma_3} + \gamma_3\xi_1\eta_1 2|A_2||C_2|\cos\varphi_{A_2C_2} \end{Bmatrix}, \quad (23)$$

$$S_4 = P_2 \begin{Bmatrix} \xi_2^2|A_3|^2 + \zeta_2^2|B_3|^2 + \eta_2^2|C_3|^2 + \zeta_2\eta_2 2|B_3||C_3|\cos\varphi_{B_3C_3\varepsilon_4} + \\ \xi_2\zeta_2 2|A_3||B_3|\cos\varphi_{A_3B_3\varepsilon_4} + \varepsilon_4\xi_2\eta_2 2|A_3||C_3|\cos\varphi_{A_3C_3} + \\ \xi_2^2|A_4|^2 + \zeta_2^2|B_4|^2 + \eta_2^2|C_4|^2 + \zeta_2\eta_2 2|B_4||C_4|\cos\varphi_{B_4C_4\gamma_4} + \\ \xi_2\zeta_2 2|A_4||B_4|\cos\varphi_{A_4B_4\gamma_4} + \gamma_4\xi_2\eta_2 2|A_4||C_4|\cos\varphi_{A_4C_4} \end{Bmatrix}, \quad (24)$$

where coefficients $A_1$, $A_2$, $A_3$, and $A_4$ represent the amplitudes of the reference beams corresponding to the first, second, third, and fourth frequency components, respectively, of input beam 24; coefficients $B_1$, $B_2$, $B_3$, and $B_4$ represent the amplitudes of background beams corresponding to reference beams $A_1$, $A_2$, $A_3$, and $A_4$, respectively; coefficients $C_1$, $C_2$, $C_3$, and $C_4$ represent the amplitudes of the return measurement beams corresponding to reference beams $A_1$, $A_2$, $A_3$, and $A_4$, respectively; $P_1$ and $P_2$ represent the integrated intensities of the first frequency component in the first and second pulse sequences, respectively, of the input beam 324; and the values for $\in_j$ and $\gamma_j$ are listed in Table 2. The description of the coefficients $\xi_j$, $\zeta_j$, and $\eta_j$ for the quad-homodyne detection method is the same as the corresponding portion of the description given for $\xi_j$, $\zeta_j$, and $\eta_j$ of the bi-homodyne detection method.

It is assumed in Equations (21), (22), (23), and (24) that the ratios of $|A_2|/|A_1|$ and $|A_4|/|A_3|$ are not dependent on j or the value of $P_j$. In order to simplify the representation of $S_j$ so as to project the important features without departing from either the scope or spirit of the present invention, it is also assumed in Equations (21), (22), (23), and (24) that the ratios of the amplitudes of the return measurement beams corresponding to $|A_2|/|A_1|$ and $|A_4|/|A_3|$ are not dependent on j or the value of $P_j$. However, the ratios $|C_2|/|C_1|$ and $|C_4|/|C_3|$ will be different from the ratios $|A_2|/|A_1|$ and $|A_4|/|A_3|$, respectively, when the ratio of the amplitudes of the measurement beam components corresponding to $|A_2|/|A_1|$ and $|A_4|/|A_3|$, respectively, are different from the ratios $|A_2|/|A_1|$ and $|A_4|/|A_3|$, respectively.

Noting that cos $\phi_{A_2C_2}$=±sin $\phi_{A_1C_1}$ by the control of the relative phase shifts between corresponding reference and measurement beam components in beam 32, Equations (21), (22), (23), and (24) may be written, respectively, as $$S_1 = P_1 \begin{Bmatrix} \xi_1^2(|A_1|^2 + |A_2|^2) + \zeta_1^2(|B_1|^2 + |B_2|^2) + \eta_1^2(|C_1|^2 + |C_2|^2) + \\ 2\zeta_1\eta_1[|B_1||C_1|\cos\varphi_{B_1C_1\varepsilon_1} + |B_2||C_2|\cos\varphi_{B_2C_2\gamma_1}] + \\ 2\xi_1\eta_1\left[\varepsilon_1|A_1||C_1|\cos\varphi_{A_1C_1} + \right. \\ \left. \gamma_1\left(\frac{|A_2|}{|A_1|}\right)\left(\frac{|C_2|}{|C_1|}\right)|A_1||C_1|\sin\varphi_{A_1C_1}\right] + \\ 2\xi_1\zeta_1[|A_1||B_1|\cos\varphi_{A_1B_1\varepsilon_1} + |A_2||B_2|\cos\varphi_{A_2B_2\gamma_1}] \end{Bmatrix}, \quad (25)$$

-continued $$S_2 = P_1 \left\{ \begin{array}{l} \xi_2^2(|A_3|^2 + |A_4|^2) + \zeta_2^2(|B_3|^2 + |B_4|^2) + \eta_2^2(|C_3|^2 + |C_4|^2) + \\ 2\zeta_2\eta_2[|B_3||C_3|\cos\varphi_{B_3C_3\varepsilon_2} + |B_4||C_4|\cos\varphi_{B_4C_4\gamma_2}] + \\ 2\xi_2\eta_2\left(\frac{|A_3|}{|A_1|}\right)\left(\frac{|C_3|}{|C_1|}\right)\left[\begin{array}{l}\varepsilon_2|A_1||C_1|\cos\varphi_{A_1C_1} + \\ \gamma_2\left(\frac{|A_4|}{|A_3|}\right)\left(\frac{|C_4|}{|C_3|}\right)|A_1||C_1|\sin\varphi_{A_1C_1}\end{array}\right] + \\ 2\xi_2\zeta_2[|A_3||B_3|\cos\varphi_{A_3B_3\varepsilon_2} + |A_4||B_4|\cos\varphi_{A_4B_4\gamma_2}] \end{array} \right\},$$

(26)

$$S_3 = P_2 \left\{ \begin{array}{l} \xi_1^2(|A_1|^2 + |A_2|^2) + \zeta_1^2(|B_1|^2 + |B_2|^2) + \eta_1^2(|C_1|^2 + |C_2|^2) + \\ 2\zeta_1\eta_1[|B_1||C_1|\cos\varphi_{B_1C_1\varepsilon_3} + |B_2||C_2|\cos\varphi_{B_2C_2\gamma_3}] + \\ 2\xi_1\eta_1\left[\begin{array}{l}\varepsilon_3|A_1||C_1|\cos\varphi_{A_1C_1} + \\ \gamma_3\left(\frac{|A_2|}{|A_1|}\right)\left(\frac{|C_2|}{|C_1|}\right)|A_1||C_1|\sin\varphi_{A_1C_1}\end{array}\right] + \\ 2\xi_1\zeta_1[|A_1||B_1|\cos\varphi_{A_1B_1\varepsilon_3} + |A_2||B_2|\cos\varphi_{A_2B_2\gamma_3}] \end{array} \right\},$$

(27)

$$S_4 = P_2 \left\{ \begin{array}{l} \xi_2^2(|A_3|^2 + |A_4|^2) + \zeta_2^2(|B_3|^2 + |B_4|^2) + \eta_2^2(|C_3|^2 + |C_4|^2) + \\ 2\zeta_2\eta_2[|B_3||C_3|\cos\varphi_{B_3C_3\varepsilon_4} + |B_4||C_4|\cos\varphi_{B_4C_4\gamma_4}] + \\ 2\xi_2\eta_2\left(\frac{|A_3|}{|A_1|}\right)\left(\frac{|C_3|}{|C_1|}\right)\left[\begin{array}{l}\varepsilon_4|A_1||C_1|\cos\varphi_{A_1C_1} + \\ \gamma_4\left(\frac{|A_4|}{|A_3|}\right)\left(\frac{|C_4|}{|C_3|}\right)|A_1||C_1|\sin\varphi_{A_1C_1}\end{array}\right] + \\ 2\xi_2\zeta_2[|A_3||B_3|\cos\varphi_{A_3B_3\varepsilon_4} + |A_4||B_4|\cos\varphi_{A_4B_4\gamma_4}] \end{array} \right\},$$

(28)

where the relationship $\cos\phi_{A_2C_2} = \sin\phi_{A_1C_1}$ has been used without departing from either the scope or spirit of the present invention.

Information about the conjugated quadratures $|C_1|\cos\phi_{A_1C_1}$ and $|C_1|\sin\phi_{A_1C_1}$ are obtained using the symmetric and antisymmetric properties and orthogonality property of the conjugated quadratures as represented by the following digital filters applied to the signal values $S_j$:

$$F_3(S) = \left(\frac{1}{P_1'}\right)\left(\frac{S_1}{\xi_1'^2} - \frac{S_2}{\xi_2'^2}\right) - \left(\frac{1}{P_2'}\right)\left(\frac{S_3}{\xi_1'^2} - \frac{S_4}{\xi_2'^2}\right),$$

(29)

$$F_4(S) = \left(\frac{1}{P_1'}\right)\left(\frac{S_1}{\xi_1'^2} - \frac{S_2}{\xi_2'^2}\right) + \left(\frac{1}{P_2'}\right)\left(\frac{S_3}{\xi_1'^2} - \frac{S_4}{\xi_2'^2}\right).$$

(30)

The description of $\xi_j'$ and $P_j'$ for the quad-homodyne detection method is the same as the corresponding description given for $\xi_j'$ and $P_j'$ in the bi-homodyne detection method. Using Equations (25), (26), (27), (28), (29), and (30), the following expressions are obtained for the filtered quantities containing components of the conjugated quadratures $|C_1|\cos\phi_{A_1C_1}$ and $|C_1|\sin\phi_{A_1C_1}$:

$$F_3(S) = \left(\frac{P_1}{P_1'} - \frac{P_2}{P_2'}\right)\left[(|A_1|^2 + |A_2|^2)\left(\frac{\xi_1^2}{\xi_1'^2}\right) - (|A_3|^2 + |A_4|^2)\left(\frac{\xi_2^2}{\xi_2'^2}\right)\right] +$$
$$\left(\frac{P_1}{P_1'} - \frac{P_2}{P_2'}\right)\left[(|B_1|^2 + |B_2|^2)\left(\frac{\zeta_1^2}{\xi_1'^2}\right) - (|B_3|^2 + |B_4|^2)\left(\frac{\zeta_2^2}{\xi_2'^2}\right)\right] +$$
$$\left(\frac{P_1}{P_1'} - \frac{P_2}{P_2'}\right)\left[(|C_1|^2 + |C_2|^2)\left(\frac{\eta_1^2}{\xi_1'^2}\right) - (|C_3|^2 + |C_4|^2)\left(\frac{\eta_2^2}{\xi_2'^2}\right)\right] +$$
$$2\left(\frac{P_1}{P_1'} + \frac{P_2}{P_2'}\right)\left[\left(\frac{\xi_1\eta_1}{\xi_1'^2}\right) + \left(\frac{\xi_2\eta_2}{\xi_2'^2}\right)\left(\frac{|A_3|}{|A_1|}\right)\left(\frac{|C_3|}{|C_1|}\right)\right]|A_1||C_1|\cos\varphi_{A_1C_1} +$$
$$2\left(\frac{P_1}{P_1'} - \frac{P_2}{P_2'}\right)\left(\frac{|A_2|}{|A_1|}\right)\left(\frac{|C_2|}{|C_1|}\right)\left[\begin{array}{l}\left(\frac{\xi_1\eta_1}{\xi_1'^2}\right) + \\ \left(\frac{\xi_2\eta_2}{\xi_2'^2}\right)\left(\frac{|A_4|}{|A_2|}\right)\left(\frac{|C_4|}{|C_2|}\right)\end{array}\right]|A_1||C_1|\sin\varphi_{A_1C_1} +$$
$$2\left(\frac{P_1}{P_1'}\cos\varphi_{A_1B_1\varepsilon_1} - \frac{P_2}{P_2'}\cos\varphi_{A_1B_1\varepsilon_3}\right)\frac{\xi_1\zeta_1}{\xi_1'^2}|A_1||B_1| -$$
$$2\left(\frac{P_1}{P_1'}\cos\varphi_{A_3B_3\varepsilon_2} - \frac{P_2}{P_2'}\cos\varphi_{A_3B_3\varepsilon_4}\right)\frac{\xi_2\zeta_2}{\xi_2'^2}|A_3||B_3| +$$
$$2\left(\frac{P_1}{P_1'}\cos\varphi_{A_2B_2\gamma_1} - \frac{P_2}{P_2'}\cos\varphi_{A_2B_2\gamma_3}\right)\frac{\xi_1\zeta_1}{\xi_1'^2}|A_2||B_2| -$$
$$2\left(\frac{P_1}{P_1'}\cos\varphi_{A_4B_4\gamma_2} - \frac{P_2}{P_2'}\cos\varphi_{A_4B_4\gamma_4}\right)\frac{\xi_2\zeta_2}{\xi_2'^2}|A_4||B_4| +$$
$$2\left(\frac{P_1}{P_1'}\cos\varphi_{B_1C_1\varepsilon_1} - \frac{P_2}{P_2'}\cos\varphi_{B_1C_1\varepsilon_3}\right)\frac{\xi_1\zeta_1}{\xi_1'^2}|B_1||C_1| -$$
$$2\left(\frac{P_1}{P_1'}\cos\varphi_{B_3C_3\varepsilon_2} - \frac{P_2}{P_2'}\cos\varphi_{B_3C_3\varepsilon_4}\right)\frac{\xi_2\zeta_2}{\xi_2'^2}|B_3||C_3| +$$
$$2\left(\frac{P_1}{P_1'}\cos\varphi_{B_2C_2\gamma_1} - \frac{P_2}{P_2'}\cos\varphi_{B_2C_2\gamma_3}\right)\frac{\xi_1\zeta_1}{\xi_1'^2}|B_2||C_2| -$$
$$2\left(\frac{P_1}{P_1'}\cos\varphi_{B_4C_4\gamma_2} - \frac{P_2}{P_2'}\cos\varphi_{B_4C_4\gamma_4}\right)\frac{\xi_2\zeta_2}{\xi_2'^2}|B_4||C_4|,$$

(31)

$$F_4(S) = \left(\frac{P_1}{P_1'} + \frac{P_2}{P_2'}\right)\left[(|A_1|^2 + |A_2|^2)\left(\frac{\xi_1^2}{\xi_1'^2}\right) - (|A_3|^2 + |A_4|^2)\left(\frac{\xi_2^2}{\xi_2'^2}\right)\right] +$$
$$\left(\frac{P_1}{P_1'} + \frac{P_2}{P_2'}\right)\left[(|B_1|^2 + |B_2|^2)\left(\frac{\zeta_1^2}{\xi_1'^2}\right) - (|B_3|^2 + |B_4|^2)\left(\frac{\zeta_2^2}{\xi_2'^2}\right)\right] +$$
$$\left(\frac{P_1}{P_1'} + \frac{P_2}{P_2'}\right)\left[(|C_1|^2 + |C_2|^2)\left(\frac{\eta_1^2}{\xi_1'^2}\right) - (|C_3|^2 + |C_4|^2)\left(\frac{\eta_2^2}{\xi_2'^2}\right)\right] +$$
$$2\left(\frac{P_1}{P_1'} - \frac{P_2}{P_2'}\right)\left[\left(\frac{\xi_1\eta_1}{\xi_1'^2}\right) + \left(\frac{\xi_2\eta_2}{\xi_2'^2}\right)\left(\frac{|A_3|}{|A_1|}\right)\left(\frac{|C_3|}{|C_1|}\right)\right]|A_1||C_1|\cos\varphi_{A_1C_1} +$$
$$2\left(\frac{P_1}{P_1'} + \frac{P_2}{P_2'}\right)\left(\frac{|A_2|}{|A_1|}\right)\left(\frac{|C_2|}{|C_1|}\right)\left[\begin{array}{l}\left(\frac{\xi_1\eta_1}{\xi_1'^2}\right) + \\ \left(\frac{\xi_2\eta_2}{\xi_2'^2}\right)\left(\frac{|A_4|}{|A_2|}\right)\left(\frac{|C_4|}{|C_2|}\right)\end{array}\right]|A_1||C_1|\sin\varphi_{A_1C_1} +$$
$$2\left(\frac{P_1}{P_1'}\cos\varphi_{A_1B_1\varepsilon_1} + \frac{P_2}{P_2'}\cos\varphi_{A_1B_1\varepsilon_3}\right)\frac{\xi_1\zeta_1}{\xi_1'^2}|A_1||B_1| -$$
$$2\left(\frac{P_1}{P_1'}\cos\varphi_{A_3B_3\varepsilon_2} + \frac{P_2}{P_2'}\cos\varphi_{A_3B_3\varepsilon_4}\right)\frac{\xi_2\zeta_2}{\xi_2'^2}|A_3||B_3| +$$
$$2\left(\frac{P_1}{P_1'}\cos\varphi_{A_2B_2\gamma_1} + \frac{P_2}{P_2'}\cos\varphi_{A_2B_2\gamma_3}\right)\frac{\xi_1\zeta_1}{\xi_1'^2}|A_2||B_2| -$$
$$2\left(\frac{P_1}{P_1'}\cos\varphi_{A_4B_4\gamma_2} + \frac{P_2}{P_2'}\cos\varphi_{A_4B_4\gamma_4}\right)\frac{\xi_2\zeta_2}{\xi_2'^2}|A_4||B_4| +$$
$$2\left(\frac{P_1}{P_1'}\cos\varphi_{B_1C_1\varepsilon_1} + \frac{P_2}{P_2'}\cos\varphi_{B_1C_1\varepsilon_3}\right)\frac{\xi_1\zeta_1}{\xi_1'^2}|B_1||C_1| -$$
$$2\left(\frac{P_1}{P_1'}\cos\varphi_{B_3C_3\varepsilon_2} + \frac{P_2}{P_2'}\cos\varphi_{B_3C_3\varepsilon_4}\right)\frac{\xi_2\zeta_2}{\xi_2'^2}|B_3||C_3| +$$
$$2\left(\frac{P_1}{P_1'}\cos\varphi_{B_2C_2\gamma_1} + \frac{P_2}{P_2'}\cos\varphi_{B_2C_2\gamma_3}\right)\frac{\xi_1\zeta_1}{\xi_1'^2}|B_2||C_2| -$$
$$2\left(\frac{P_1}{P_1'}\cos\varphi_{B_4C_4\gamma_2} + \frac{P_2}{P_2'}\cos\varphi_{B_4C_4\gamma_4}\right)\frac{\xi_2\zeta_2}{\xi_2'^2}|B_4||C_4|.$$

(32)

The parameters $$\left[\left(\frac{|A_2|}{|A_1|}\right)\left(\frac{|C_2|}{|C_1|}\right)\right], \quad (33)$$

$$\left[\left(\frac{|A_4|}{|A_2|}\right)\left(\frac{|C_4|}{|C_2|}\right)\right], \quad (34)$$

$$\left[\left(\frac{|A_3|}{|A_1|}\right)\left(\frac{|C_3|}{|C_1|}\right)\right] \quad (35)$$

need to be determined in order to complete the determination of a conjugated quadratures for certain end use applications. The parameters given by Equations (33), (34), and (35) can for example be measured by procedures analogous to the procedure described for the bi-homodyne detection method with respect to measuring the quantity specified by Equation (15).

The remaining description of the quad-homodyne detection method is the same as corresponding portion of the description given for the bi-homodyne detection method.

Two different modes are described for the acquisition of the electrical interference signals 372. The first mode to be described is a step and stare mode wherein substrate 360 is stepped between fixed locations corresponding to locations where image information is desired. The second mode is a scanning mode. In the step and stare mode for generating a one-dimensional, a two-dimensional or a three-dimensional profile of substrate 360, substrate 360 mounted in wafer chuck 384/stage 390 is translated by stage 390. The position of stage 390 is controlled by transducer 382 according to servo control signal 378 from electronic processor and controller 380. The position of stage 390 is measured by metrology system 388 and position information acquired by metrology system 388 is transmitted to electronic processor and controller 380 to generate an error signal for use in the position control of stage 390. Metrology system 388 may comprise for example linear displacement and angular displacement interferometers and cap gauges.

Electronic processor and controller 380 directs the translation of wafer stage 390 to a desired position and then acquires a set of four electrical interference signal values. After the acquisition of the sequence of four electrical interference signals, electronic processor and controller 380 then repeats the procedure for the next desired position of stage 390. The elevation and angular orientation of substrate 360 is controlled by transducers 386A and 386B. Changes in elevation that are required for the acquisition of sets of conjugated quadratures used in the compensation of undesired components of return measurement beams is also controlled by transducers 386A and 386B.

The second mode for the acquisition of the electrical interference signal values is next described wherein the electrical interference signal values are obtained with the position of stage 390 scanned in one or more directions. In the scanning mode, source 318 is pulsed at times controlled by signal 392 from signal processor and controller 380. Source 318 is pulsed at times corresponding to the registration of the conjugate image of pinholes of pinhole array beam-splitter 312 with positions on and/or in substrate 360 for which image information is desired.

There are a number of different ways for producing a pulsed source [see Chapter 11 entitled "Lasers", *Handbook of Optics*, 1, 1995 (McGraw-Hill, New York) by W. Silfvast]. There will be a restriction on the duration or "pulse width" of a beam pulse $\tau_{p1}$ produced by source 318 as a result of the continuous scanning mode used in the second mode for the acquisition of the electrical interference signal values of the first embodiment. Pulse width $\tau_{p1}$ will be a parameter that in part controls the limiting value for spatial resolution in the direction of a scan to a lower bound of $$\tau_{p1}v, \quad (36)$$

where v is the scan speed. For example, with a value of $\tau_{p1}$=50 nsec and a scan speed of v=0.20 m/sec, the limiting value of the spatial resolution $\tau_{p1}v$ in the direction of scan will be $$\tau_{p1}v=10 \text{ nm}. \quad (37)$$

Pulse width $\tau_{p1}$ will also determine the minimum frequency difference that can be used in the bi- and quad-homodyne detection methods. In order that there be no contributions to the electrical interference signals from interference between fields of different conjugated quadratures, the minimum frequency spacing $\Delta f_{min}$ is expressed as $$\Delta f_{min} \gg \frac{1}{\tau_{p1}}. \quad (38)$$

For the example of $\tau_{p1}$=50 nsec, $1/\tau_{p1}$=20 MHz.

The frequencies of input beam 324 are controlled by signals 374 and 392 from signal processor and controller 380 to correspond to the frequencies from a set of four frequencies that will yield the desired phase shifts between the reference and return measurement beam components of output beam components 330A and 330B. In the first mode for the acquisition of the electrical interference signals 372, each set of four arrays of electrical interference signal values from the sets of arrays of four electrical interference signal values corresponding to the set of four phase shift values are generated by common pixels of detector 370 for single- and bi-homodyne detection methods. In the second mode for the acquisition of electrical interference signals 372, each corresponding set of four electrical interference signal values from the sets of arrays of four electrical interference signal values are generated by a conjugate set of four different pixels of detector 370. Thus in the second mode of acquisition, the differences in pixel efficiency and the differences in sizes of pinholes in pinhole array beam-splitter 312 need to be compensated in the signal processing by signal processor and controller 380 as described in the description of the bi- and quad-homodyne detection methods in cited U.S. Provisional Application No. 60/442,858 (ZI-47) and U.S. patent application filed Jan. 27, 2004 (ZI-47) and entitled "Apparatus and Method for Joint Measurements of Conjugated Quadratures of Fields of Reflected/Scattered and Transmitted Beams by an Object in Interferometry." The joint measurements of conjugated quadratures of fields are generated by electric processor and controller 380 as described in the description of the bi- and quad-homodyne detection methods of the cited U.S. Provisional Application No. 60/442,858 (ZI-47) and corresponding U.S. patent application.

The advantage of the second or scanning mode is that the electrical interference signal values are acquired in a scanning mode which increases throughput of the interferometric confocal microscopy system.

The description of source 318 and beam-conditioner 322 is the same as corresponding portions of the description given for the source and beam conditioner described in cited U.S. Provisional Application No. 60/442,858 (ZI-47) and U.S. patent Application filed Jan. 27, 2004 (ZI-47) and entitled "Apparatus and Method for Joint Measurements of Conjugated Quadratures of Fields of Reflected/Scattered and Transmitted Beams by an Object in Interferometry."

Interferometric confocal imaging systems such as a catadioptric imaging system of the first embodiment may be used in a way to compensate for the astigmatism of the image of the third component of a return measurement beam wherein the third component of the return measurement beam is generated by radiated fields of excited leaky guided-wave modes of a trench in a substrate 360 being imaged. The magnitude of the astigmatism in the imaging system is proportional to the square of the image field coordinate. As a result, a well compensated image may be obtained by selecting the image field coordinate of a detector pixel used to measure the conjugated quadratures of the radiated fields such that the astigmatism of the imaging system has the same magnitude but opposite sign as the astigmatism associated with the return measurement beam generated by the radiated fields of the excited leaky guided-wave modes. The compensation of the astigmatism increases the signal-to-noise ratios that can be achieved when measuring properties of a trench.

The sagittal image plane in the interferometric confocal imaging system for the first embodiment is flat and the tangential image plane of the interferometric confocal imaging system is curved towards the imaging system. The sign of the resulting astigmatism is correct for the use of the imaging system astigmatism to compensate for the astigmatism present in the return measurement beam generated by the radiated fields of excited leaky guided-wave modes of a trench when the long direction of the trench is aligned with a sagittal plane.

Relative variations in the depth of a trench along the trench are determined with high sensitivity from changes in the phase of the conjugated quadratures of fields radiated by the excited leaky guided-wave modes of the trench relative to the phase of beams reflected from surface 160 using properties of Equation (1). The depth of a trench relative to surface 160 is determined as the location of the image point such as 166 in FIG. 1a for which the amplitude of the measured conjugated quadratures is a maximum. Relative information about the width of a trench is obtained from the measured amplitude of the conjugated quadratures of beams radiated by an excited guided-wave mode corrected for the attenuation effects of the imaginary component of $\beta$ due to transmission of the leaky guided waves by the slab wave guide given by Equation (5). Defects in a trench such as defects in the walls of the trench or an obstruction within the trench are located by scanning along a trench and looking for variations in the amplitude of the conjugated quadratures of the beams radiated by the excited guided-wave modes. Signatures of defects will be changes in the amplitude of the conjugated quadratures of the beams radiated by the excited guided-wave modes.

Effects of background beams are reduced in the first embodiment as a result of the use of a confocal microscopy system. The effects of background beams may further be reduced interferometrically in variants of the first embodiment by the use of the phase shifting procedure described with respect to phase shifting element 356 shown in FIG. 2b. The effects of background beams may also be eliminated and/or reduced in other variants of the first embodiment by use of different spatial properties of background beams with respect to properties of beams radiated by leaky-guided wave modes, and the spatial properties of excited antisymmetric guided-wave modes for which conjugated quadratures are measured. The elimination or reduction of the effects of background beams in the other variants of the first embodiment is achieved by measuring the conjugated quadratures of return measurement beams corresponding to two different vertical locations of substrate 360 and subtracting the measured conjugated quadratures to obtain a difference conjugated quadratures. The difference conjugated quadratures has the effects of background beams eliminated or reduced while the conjugated quadratures of the beams radiated by excited leaky guided-wave modes are detected with a high efficiency.

It was noted in the description of the first, second, and third components of return measurement beams with respect to FIGS. 1a, 1b, and 1c that each of the first, second, and third components of return measurement beams were characterized as being generated by respective sources in or near surface 160. The respective sources in or near surface 160 were different from each other so that the contribution of the first and second components which are background beam components to the sets of measured arrays of signal values are greatly reduced as a result of the confocal imaging properties of catadioptric imaging system 310.

It was further noted in the description of the first, second, and third components of return measurement beams with respect to FIGS. 1a, 1b, and 1c that the conjugated quadratures of the first and second components corresponding to the first and second components of beam 142 that is measured when the image plane coincides with the plane in which the conjugate of spot 166 is in focus is the same as the conjugated quadratures of the first and second components of beam 242 that is measured when the image plane coincides with the plane in which the conjugate of spot 170 is in focus. However, the conjugated quadratures of the third component corresponding to the third component of beam 142 that is measured when the image plane coincides with the plane in which the conjugate of spot 166 is in focus is not the same as the conjugated quadratures of the third component corresponding to the third component of beam 242 that is measured when the image plane coincides with the plane in which the conjugate of spot 170 is in focus. In the first embodiment, measurements of conjugated quadratures of the third components of beams 142 and 242 may be obtained wherein the contributions of reflections from surface 160 and the contribution from scattering by aperture 156 are compensated by combining conjugated quadratures of fields corresponding to beams 142 and 242 measured for $z_1=z_2$.

Background beam components in return measurement beams may also be eliminated or reduced in the first embodiment when properties of excited antisymmetric guided-wave modes in trenches are measured. The antisymmetric guided-wave modes are preferentially excited when the half-wave phase shifter 356 is used in the first embodiment. The effects of the 90 phase shift between the third components of return measurement beams 142 and 242 are compensated by the half wave phase shifter 356 in the imaging system so that the corresponding images formed are symmetric. However, the effects of the $\pi$ phase shift introduced by half-wave phase-shifter 356 is not compensated for background beam components generated by scattering of measurement and return measurement beams in catadioptric imaging system 310 with the result that the amplitude of the corresponding background beam components imaged at a respective pinhole in pinhole array beam-splitter 312 is substantially antisymmetric. The resulting electric interference term between the respective symmetric reference beam and substantially antisymmetric background beam is substantially zero. This technique for elimination or reduction of effects of background beams is also described in commonly owned U.S. Pat. No. 5,760,901 entitled "Method And Apparatus For Confocal Interference Microscopy With Background Amplitude Reduction and Compensation," U.S. Pat. No. 6,480,285 entitled "Multiple Layer Confocal Interference Microscopy Using Wavenumber Domain Reflectometry And Background Amplitude Reduction And Compensation," and U.S. Pat. No. 6,633,388 [ZI-20] entitled "Scanning Interferometric Near-Field Confocal Microscopy with Background Amplitude Reduction and Compensation" wherein each of the three U.S. Patents are by Henry A. Hill. The contents of each of the three cited U.S. patents are herein incorporated in their entirety by reference.

A trench may be filled with a dielectric or transparent medium with an index of refraction $n_T$. The description of the guided wave modes will be the same as described herein when the trench is not filled when $n_T<n_W$ except that there will be aberrations introduced. The properties of the aberrations will be the same as the properties of aberrations introduced when imaging inside of a substrate. The aberrations can be compensated in a variant of the first embodiment is accomplished by introducing a thin layer (the thin layer has an index of refraction different from lens 352) between lens 352 and pinhole array beam-splitter 312 such as described in commonly owned U.S. Provisional Patent Application No. 60/444,707 filed Feb. 4, 2003 [ZI-44] entitled "Compensation for Effects of Mismatch in Indices of Refraction at a Substrate-Medium Interface in Confocal and Interferometric Confocal Microscopy" by Henry A. Hill the contents of which are herein incorporated in their entirety by reference. The procedure will also work for the case of $n_T>n_W$. However, in this case the excited guided-wave modes will not be of the leaky class.

A second embodiment comprises the interferometer system of FIGS. 2a–2c with interferometer 310 comprising an interferometric far field confocal microscope such as described in cited U.S. Pat. No. 5,760,901. In the second embodiment, beam-conditioner 322 is configured as the two-frequency generator and phase-shifter.

A third embodiment comprises the interferometer system of FIGS. 2a–2c with interferometer 310 comprising an interferometric far field confocal microscope such as described in cited U.S. Pat. No. 5,760,901 wherein the phase masks are removed. In the third embodiment, beam-conditioner 322 is configured as a two-frequency generator and phase-shifter.

A fourth embodiment comprises the interferometer system of FIGS. 2a–2c with interferometer 310 comprising an interferometric far field confocal microscope such as described in cited U.S. Pat. No. 6,480,285. In the fourth embodiment, beam-conditioner 322 is configured as a two-frequency generator and phase-shifter.

A fifth embodiment comprises the interferometer system of FIGS. 2a–2c with interferometer 310 comprising an interferometric far field confocal microscope such as described in cited U.S. Pat. No. 6,480,285 wherein the phase masks are removed. In the fifth embodiment, beam-conditioner 322 is configured as a two-frequency generator and phase-shifter.

Leaky guided-wave modes may also be excited in vias and corresponding properties measured.

Leaky guided-wave modes in a trench are excited using near-field probe beams such as described in commonly owned U.S. Pat. No. 6,445,453 B1 [ZI-14] entitled "Scanning Interferometric Near-Field Confocal Microscopy" by Henry A. Hill the contents of which are herein incorporated by reference and in commonly owned U.S. Pat. No. 6,633,388 [ZI-20]. In the other embodiments, the subwavelength apertures comprise slits with subwavelength widths.

What is claimed is:

1. A method of using an interferometric confocal microscope to measure features of a trench or via in a substrate, wherein the interferometric confocal microscope produces a measurement beam, the method comprising:
   focusing the measurement beam at a selected location at or near the bottom of the trench or via to excite one or more guided-wave modes within the trench or via;
   measuring properties of a return measurement beam that is produced when the measurement beam is focused at the selected location, said return measurement beam including a component corresponding to a radiated field from the one or more guided-wave modes that are excited within the trench; and
   determining the features of the trench or via from the measured properties of the return measurement beam.

2. The method of claim 1, further comprising scanning the measurement beam in a direction that is substantially normal to the substrate to locate the bottom of the trench or via.

3. The method of claim 1, wherein determining features involves determining a depth of the trench or via.

4. The method of claim 1, further comprising:
   focusing the measurement beam at a selected distance above the surface of the substrate and over the trench or via; and
   measuring properties of a return measurement beam that is produced when the measurement beam is focused at the selected distance above the surface of the substrate and over the trench or via,
   wherein determining the features of the trench or via involves combining measurements of properties of the first-mentioned return measurement beam and measurements of properties of the second-mentioned return measurement beam.

5. The method of claim 4, wherein the selected location is a distance Z1 below the top surface of the substrate, where the selected distance is a distance Z2 above the surface of the substrate, and wherein Z1 equals Z2.

6. The method of claim 1, wherein the one or more guided-wave modes that are excited are leaky guided-wave modes.

7. The method of claim 1, further comprising generating a measurement beam that is asymmetric.

8. The method of claim 1, further comprising generating a measurement beam that is asymmetric.

9. The method of claim 1, wherein measuring the properties of the return measurement beam comprises measuring conjugated quadratures of fields of the return measurement beam.

10. The method of claim 4, wherein measuring properties of the field of a return measurement beam that is produced when the measurement beam is focused at the selected distance above the surface of the substrate and over the trench or via comprises measuring conjugated quadratures of fields of that return measurement beam.

11. The method of claim 10, wherein determining the features of the trench or via involves combining the measurements of conjugated quadratures of fields of the return measurement beam that is produced when the measurement beam is focused at the selected location and measurements of conjugated quadratures of fields of the return measurement beam that is produced when the measurement beam is focused at the selected distance above the surface of the substrate and over the trench or via.

12. The method of claim 1, wherein measuring the properties of the return measurement beam involves using a bi-homodyne detection technique.

13. The method of claim 1, wherein measuring the properties of the return measurement beam involves using a quad-homodyne detection technique.

14. The method of claim 1, wherein the interferometric confocal microscope is a far-field interferometric confocal microscope and the measurement beam is a far-field measurement beam.

15. The method of claim 1, wherein the interferometric confocal microscope is a near-field interferometric confocal microscope and the measurement beam is a near-field measurement beam.

16. The method of claim 1, further comprising performing the steps of focusing and measuring at a plurality of locations along the bottom of the trench to detect a defect within the trench, wherein said selected location is one of said plurality of locations.

* * * * *